United States Patent [19]
Nagai et al.

[11] Patent Number: 6,066,939
[45] Date of Patent: May 23, 2000

[54] SECONDARY BATTERY PACK

[75] Inventors: Tamiji Nagai, Kangawa; Toshitaka Takei, Kanagawa; Kuniharu Suzuki, Tokyo, all of Japan

[73] Assignee: Sony Corporation, Tokyo, Japan

[21] Appl. No.: 09/095,040

[22] Filed: Jun. 10, 1998

[30] Foreign Application Priority Data

Jun. 11, 1997 [JP] Japan ................................ P09-153913

[51] Int. Cl.[7] ...................................................... H02J 7/00
[52] U.S. Cl. ........................................... 320/128; 320/127
[58] Field of Search ..................................... 320/128, 127

[56] References Cited

U.S. PATENT DOCUMENTS 5,355,073  10/1994  Nguyen ................................... 320/153
5,905,362   5/1999  Nagano et al. ........................ 320/125

*Primary Examiner*—Adolf Deneke Berhane
*Assistant Examiner*—Lawrence Luk
*Attorney, Agent, or Firm*—Jay H. Maioli

[57] ABSTRACT

A secondary battery pack includes first and second terminal portions connected to a load device or a charging device, a secondary battery, a voltage detecting means for detecting a voltage applied to the secondary battery or a battery voltage of the secondary battery, a switch means connected between the first or the second terminal portion and the secondary battery and set to its disconnected state when the voltage detecting means detects a first voltage, and a charging circuit connected between the first or the second terminal portion and the secondary battery and controlled based on a voltage detected by the voltage detecting means with reference to a second voltage lowered by a predetermined voltage as compared with the first voltage.

14 Claims, 20 Drawing Sheets

SECONDARY BATTERY PACK

BACKGROUND

1. Field of the Invention

The present invention relates to a secondary battery pack incorporating a secondary battery such as a lithium ion battery or the like.

2. Background of the Invention

A secondary battery which is a rechargeable battery may be housed in a casing called a battery pack. This battery pack houses secondary batteries of a predetermined number which are connected to one another in series or in parallel (or houses only one secondary battery), and incorporates a protection circuit for the secondary batteries housed therein to prevent the secondary batteries from being overcharged or overdischarged and to prevent the second batteries from being damaged because of short circuit of terminal portions. The secondary battery pack sometimes incorporates circuits required when the secondary batteries are charged, circuits for adjusting a charging voltage and a charging current, and so on.

FIG. 1 is a diagram showing an example of a secondary battery pack incorporating a charging circuit and a protection circuit. This secondary battery pack has a positive side terminal portion 1 and a negative side terminal portion 2. The positive side terminal portion 1 is connected to a positive electrode of a secondary battery B through a charging circuit 3 and a protecting circuit 4. A negative electrode of the secondary battery B is connected to the negative side terminal portion 2. The charging circuit 3 is a circuit for, under the control of a charge control circuit 5, adjusting a voltage and a current obtained from the outside to supply the same to the secondary battery B. The protecting circuit 4 is a circuit for separating the secondary battery B from the terminal 1 side when the protection control circuit 6 detects an abnormal state of a voltage between terminals of the secondary battery B or the like. While in this embodiment the charging circuit 3 and the protecting circuit 4 are connected between the positive side terminal portion 1 and the secondary battery B, they may be connected between the negative side terminal portion 2 and the secondary battery B.

FIG. 2 is a diagram showing an example of the charging circuit 3 and a control circuit 5 therefor. In FIG. 2, a lithium ion battery is employed as the secondary battery B. When the lithium ion battery is employed, a constant current charging characteristic and a constant voltage charging characteristic must be considered upon a charging operation. A current detecting circuit 5a detects a charging current obtained at the terminal portion 1 to control a charging current flowing from a constant current circuit 3a connected between the terminal portion 1 and the secondary battery B toward the secondary battery B side. A voltage detecting circuit 5b detects the voltage between the terminals of the secondary battery B to control a voltage applied from a constant voltage circuit 3b connected between the terminal portion 1 and the secondary battery B toward the secondary battery b side to be a predetermined constant voltage.

FIG. 3 is a diagram showing an example of the protection circuit 4 and a control circuit 6 therefor. A detecting circuit 6a detects a voltage difference between both ends of a resistor R0 connected to one electrode of the secondary battery B, thereby detects a current flowing through the secondary battery B as a voltage. Based on a signal indicative of detection of the voltage, a switch circuit 4a connected between the secondary battery B and the negative side terminal portion 2 is controlled.

While in this example the protecting circuit for detecting a current is described, a protecting circuit controlled by detection of a voltage such as a battery voltage or the like may be employed.

Since the charging circuit and the protecting circuit are formed as separate circuits as described above, an arrangement of a circuit incorporated in a secondary battery pack disadvantageously becomes complicated. Specifically, since a voltage detected by a voltage detecting circuit for controlling a charging operation (e.g., a voltage used for a charging operation with a constant voltage) is different from a voltage detected by a protecting circuit for protecting a secondary battery and the like (e.g., a maximum voltage applicable to a secondary battery), the voltages of two kinds must independently be detected by the charging circuit and the protecting circuit and controlled, which leads to a complicated circuit arrangement of the secondary battery pack.

SUMMARY OF THE INVENTION

In view of such aspects, it is an object of the present invention to allow one common circuit to be employed as both a circuit for charging a secondary battery and a circuit for protecting the same to thereby simplify an arrangement of a circuit connected to the secondary battery.

According to an aspect of the present invention, a secondary battery pack includes first and second terminal portions connected to a load device or a charging device, a secondary battery, a voltage detecting means for detecting a voltage applied to the secondary battery or a battery voltage of the secondary battery, a switch means connected between the first or the second terminal portion and said secondary battery and set in its disconnected state when the voltage detecting means detects a first voltage, and a charging circuit connected between the first or the second terminal portion and said secondary battery and controlled based on a voltage detected by the voltage detecting means with reference to a second voltage lowered by a predetermined voltage as compared with the first voltage.

According to another aspect of the present invention, a battery charging method includes a step of detecting a voltage when a DC power source for a charging operation is supplied from the outside to terminals, a step of detecting a detection voltage lowered by a predetermined voltage from a reference voltage, a step of setting the voltage constant, a step of, if it is detected that a constant voltage circuit malfunctions, determining whether or not a voltage equal to or higher than the reference voltage is applied, a step of operating a stopper circuit, a step of setting a switch circuit in its off-state, a step of stopping a charging operation, a step of, after the processing of detecting a voltage when a DC power source for a charging operation is supplied from the outside to terminals, permitting the stopper circuit to detect a voltage with reference to the reference voltage, and a step of determining whether or not a voltage equal to or higher than the reference voltage is applied.

DESCRIPTION OF THE PREFERRED EMBODIMENTS

Secondary battery packs according to embodiments of the present invention will be described with the accompanying drawings. In each of the embodiments according to the present invention, a lithium ion battery is employed as a secondary battery.

Figure 4:
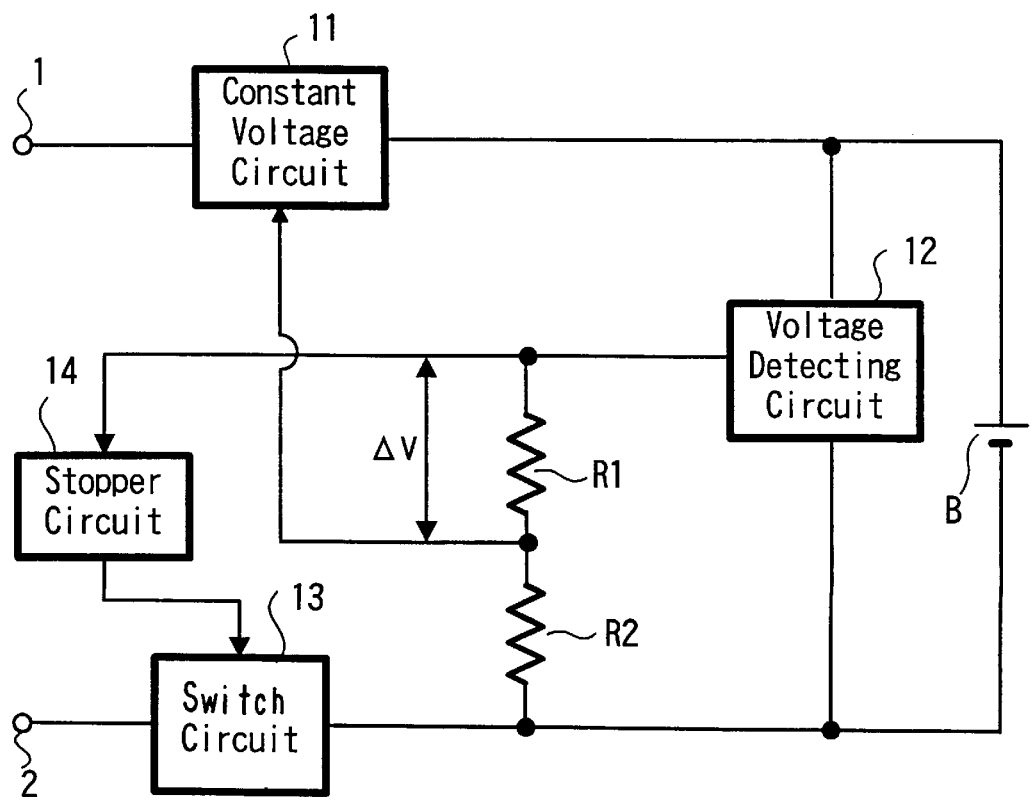
FIG. 4 is a block diagram showing a secondary battery pack according to a first embodiment of the present invention.

A secondary battery pack according a first embodiment of the present invention will be described. FIG. 4 is a block diagram showing an arrangement of the secondary battery pack according to the first embodiment. This secondary battery pack according to the first embodiment has a positive side terminal portion 1 and a negative side terminal portion 2 and incorporates a secondary battery B formed of a lithium ion battery. The positive side terminal portion 1 is connected to a positive electrode of the secondary battery B through a constant voltage circuit 11 which is a circuit for charging the secondary battery B. The negative side terminal portion 2 is connected to a negative electrode of the secondary battery B through a switch circuit 13 which functions as a protecting circuit. A potential between the positive and negative electrodes of the secondary battery B is detected by a voltage detecting circuit 12. A detection output unit thereof is connected to a stopper circuit 14. The voltage detecting circuit 12 carries out a voltage detecting processing employing as a reference voltage a maximum voltage which can be applied to the secondary battery B. The stopper circuit 14 is a circuit for controlling a connected state or a disconnected state of the switch circuit 13. Based on the detection output from the voltage detecting circuit 12, the stopper circuit 14 controls the switch circuit 13.

The detection output unit of the voltage detecting circuit 12 is connected to the negative electrode side of the secondary battery B through a series circuit formed of resistors R1, R2. A connection middle point between the resistors R1 and R2 is connected to a control unit of the constant voltage circuit 11. Accordingly, a signal supplied to the constant voltage circuit 11 from the voltage detecting circuit 12 is a signal having a voltage which is lower by a voltage ΔV equal to a voltage amount lowered by the resistor R1, as compared with a signal supplied from the voltage detecting circuit 12 to the stopper circuit 14 side.

The constant voltage circuit 11 is a circuit for controlling, based on an output from the voltage detecting circuit 12 through the resistor R1, a charging voltage supplied to the secondary battery B side to be a constant voltage. Specifically, since, when the lithium ion battery is employed as the secondary battery B, the secondary battery B must be charged with a constant voltage, the constant voltage circuit 11 adjusts a charging voltage used for charging a battery with a constant voltage. In this case, since a detection signal supplied from the voltage detecting circuit 12 and used for the constant voltage circuit 11 to control the voltage is supplied to the constant voltage circuit 11 after the signal is voltage-divided by the resistors R1, R2, the constant voltage circuit 11 controls the voltage to be constant with reference to a voltage which is lower by a lowered voltage amount $\Delta V$ determined by a voltage division ratio of the resistors as compared with the reference voltage used for controlling the switch circuit 13.

The switch circuit 13 is formed of a switch means (such as a field effect transistor or the like) for controlling a connection state between the negative side terminal portion 2 and the negative electrode side of the secondary battery B. Based on the signal supplied to the stopper circuit 14 from the voltage detecting circuit 12, a connected state or disconnected state of the switch means is controlled. Specifically, when the voltage detecting circuit 12 detects that the detected voltage exceeds the predetermined reference voltage, the switch circuit 13 is brought to its disconnected state. When the voltage detecting circuit 12 detects that the detected voltage does not exceed the reference voltage, the switch circuit 13 is brought to its connected state. Thus, the switch circuit 13 is controlled.

Since the arrangement shown in FIG. 4 is employed, when some power supply apparatus is connected to the terminal portions 1, 2, the constant voltage circuit 11 carries out the constant voltage processing based on the voltage detected by the voltage detecting circuit 12, thereby charging the secondary battery B with a constant voltage. When the voltage exceeds the reference voltage detected by the voltage detecting circuit 12, the switch circuit 13 serving as the circuit for protecting the secondary battery B disconnect the terminal portion 2 and the secondary battery B to thereby protect the secondary battery B.

Figure 5:
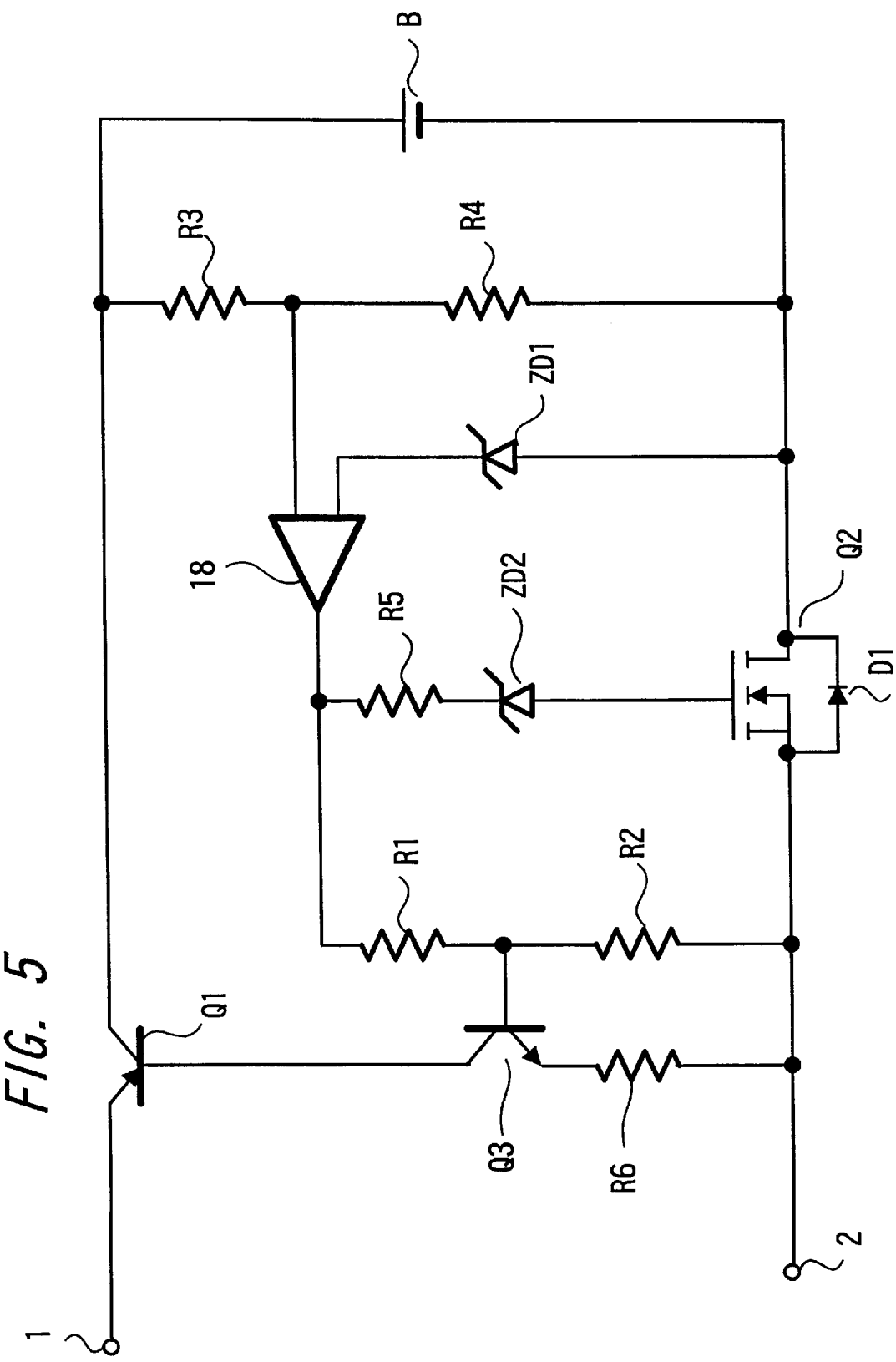
FIG. 5 is a diagram showing a specific arrangement of the secondary battery pack according to the first embodiment of the present invention.

FIG. 5 is a diagram showing a specific circuit arrangement of the secondary battery pack according to the first embodiment, by way of example. The positive side terminal portion 1 is connected through an emitter of a PNP type transistor Q1 and a collector thereof to the positive electrode side of the secondary battery B. The negative electrode of the secondary battery B is connected to the negative side terminal portion 2 through a source and a drain of a field effect transistor Q2 forming the switch circuit 13. A series circuit formed of resistors R3, R4 is connected between positive and negative electrode sides of the secondary battery B. A connection middle point between the resistors R3, R4 is connected to one input unit of a comparator 18. The negative electrode side of the secondary battery B is connected to the other input unit of the comparator 18 through a Zener diode ZD1. Since the comparator 18 is thus connected, the comparator 18 detects a potential at the one input unit thereof with reference to that at the other input unit connected to the Zener diode ZD1.

A detection output from the comparator 18 is connected to the negative side terminal portion 2 through the series circuit formed of the resistors R1, R2. The connection middle point between the resistors R1, R2 is connected to a base of an NPN type transistor Q3. A collector of the transistor Q3 is connected to a base of the transistor Q1. An emitter of the transistor Q3 is connected to the negative side terminal portion 2 through a resistor R6.

The comparator 18 is connected to the field effect transistor Q2 so that a detection output from the comparator 18 should be supplied to a gate of the field effect transistor Q2 through a resistor R5 and a Zener diode ZD2. In the circuit shown in FIG. 5, the field effect transistor Q2 which is the switch means also serves as the stopper circuit 14 shown in FIG. 4.

This arrangement allows the transistor Q1 forming the constant voltage circuit to be controlled with a voltage lowered by a predetermined voltage $\Delta V$ by voltage division at the resistors R1, R2 and allows the field effect transistor Q2 forming the protecting circuit to be directly controlled based on the detection output from the comparator 18.

Figure 6:
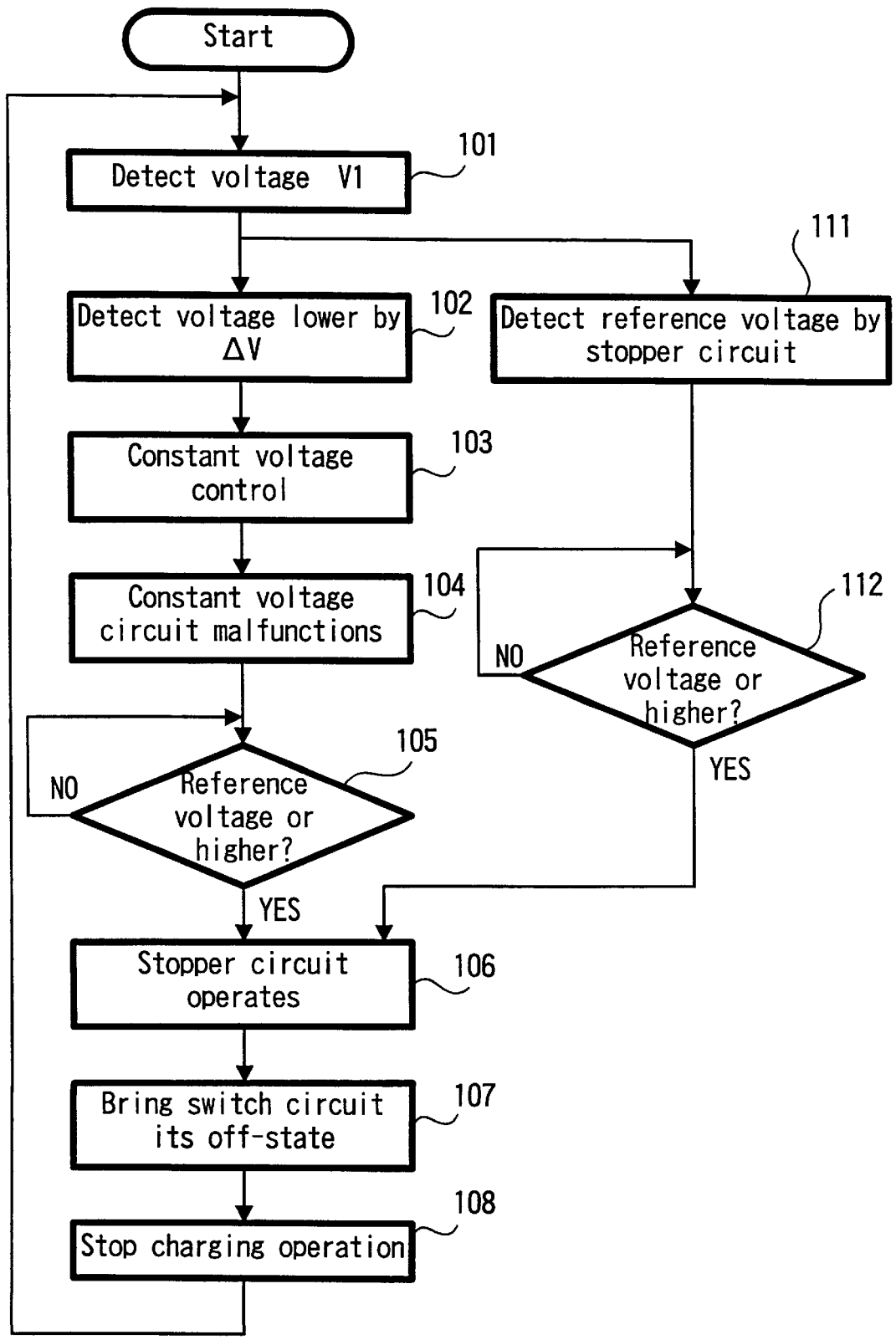
FIG. 6 is a flowchart showing a processing of the secondary battery pack according to the first embodiment of the present invention.

A processing of the arrangement of the first embodiment will be described with reference to FIG. 6 which is a flowchart therefor. In step 101, when a DC power source for a charging operation is supplied from the outside to the terminals 1, 2, the voltage detecting circuit 12 detects a voltage. Then, in this voltage detecting process, a process in step 102 of detecting a detection voltage lowered by a predetermined voltage $\Delta V$ from a reference voltage by voltage division by the resistors R1, R2 and a process in step 111 in which the stopper circuit 14 detects a voltage with reference to the reference voltage are simultaneously carried out. In the process in step 102 of detecting a detection voltage lowered by a predetermined voltage $\Delta V$ from a reference voltage, the constant voltage circuit 11 controls a voltage to be a constant voltage, and then the secondary battery B is charged with a constant voltage (in step 103). When it is detected in step 104 that the constant voltage circuit 11 malfunctions due to some factor, if it is determined in step 105 that a voltage equal to or higher than the reference voltage is applied, then the stopper circuit is operated in step 106 to bring the switch circuit 13 to its off-state (disconnected state) in step 107. Then, the charging operation is stopped in step 108.

If it is determined in step 112 that the voltage equal to or higher than the reference voltage is applied in the process in step 111 in which the stopper circuit 14 detects a voltage with reference to the reference voltage, then the process proceeds to step 106, in which the stopper circuit 14 is operated to bring the switch circuit 13 to its off-state (disconnected state) in step 107. Then, the charging operation is stopped in step 108.

According to the secondary battery pack of the first embodiment, based on the detection result of the one voltage detecting circuit, it is possible to carry out the constant voltage charging operation and carry out the protection operation required when an abnormal voltage is applied. Therefore, with a simple arrangement employing only one voltage detecting circuit, it is possible to satisfactorily charge and protect the secondary battery.

Figure 7:
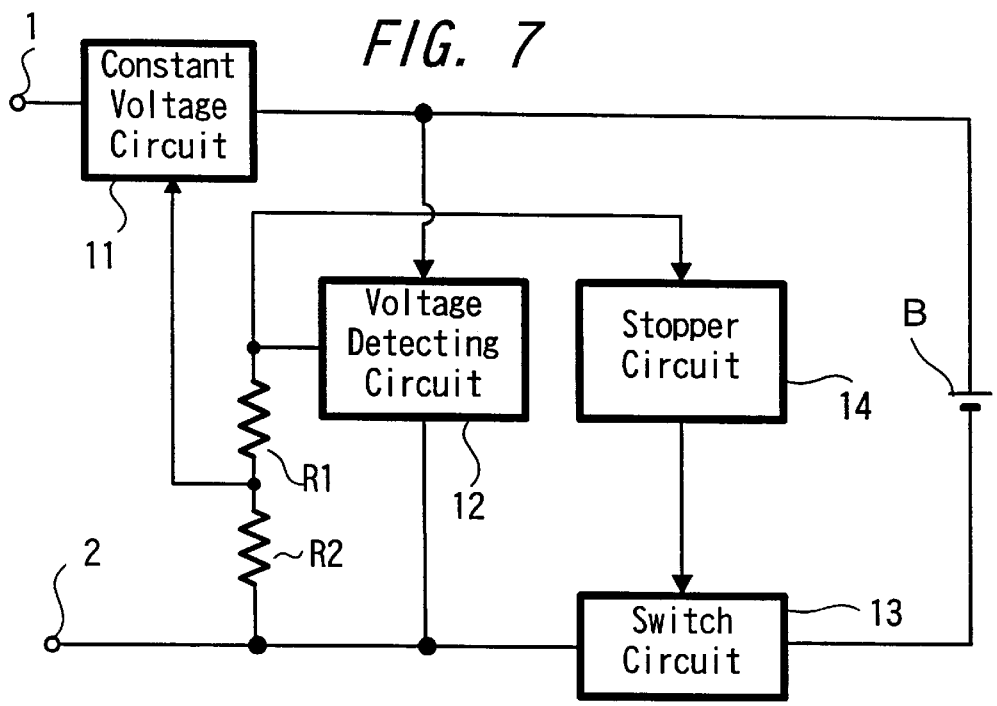
FIG. 7 is a block diagram showing a secondary battery pack according to a second embodiment of the present invention.

A secondary battery pack according to a second embodiment of the present invention will be described with reference to FIG. 7. In FIG. 7, like parts corresponding to those shown in FIGS. 4 and 5 are marked with the same references and hence need not to be described in detail. FIG. 7 is a block diagram showing an arrangement of the secondary battery pack according to the second embodiment. In the second embodiment, a connection position of the switch circuit 13 is changed as compared with that of the first embodiment.

Specifically, the switch circuit 13 is connected between the negative electrode side of the secondary battery B and the negative side terminal portion 2. The voltage detecting circuit 12 detects a voltage between the output unit of the constant voltage circuit 11 and the negative side terminal portion 2 to detect a voltage applied from the constant voltage circuit 11 to the secondary battery B. Based on the voltage detected by the voltage detecting circuit 12, the switch circuit 13 is controlled through the stopper circuit 14, and the constant voltage circuit 11 is operated with a voltage obtained by lowering the voltage detected by the voltage detecting circuit 12 by the predetermined voltage ΔV by dividing the voltage by the resistors R1, R2.

According to the secondary battery pack of the second embodiment, similarly to the first embodiment, based on the detection result of the one voltage detecting circuit, it is possible to carry out the constant voltage charging operation and carry out the protection operation required when an abnormal voltage is applied. Therefore, with a simple arrangement employing only one voltage detecting circuit, it is possible to satisfactorily charge and protect the secondary battery.

Figure 8:
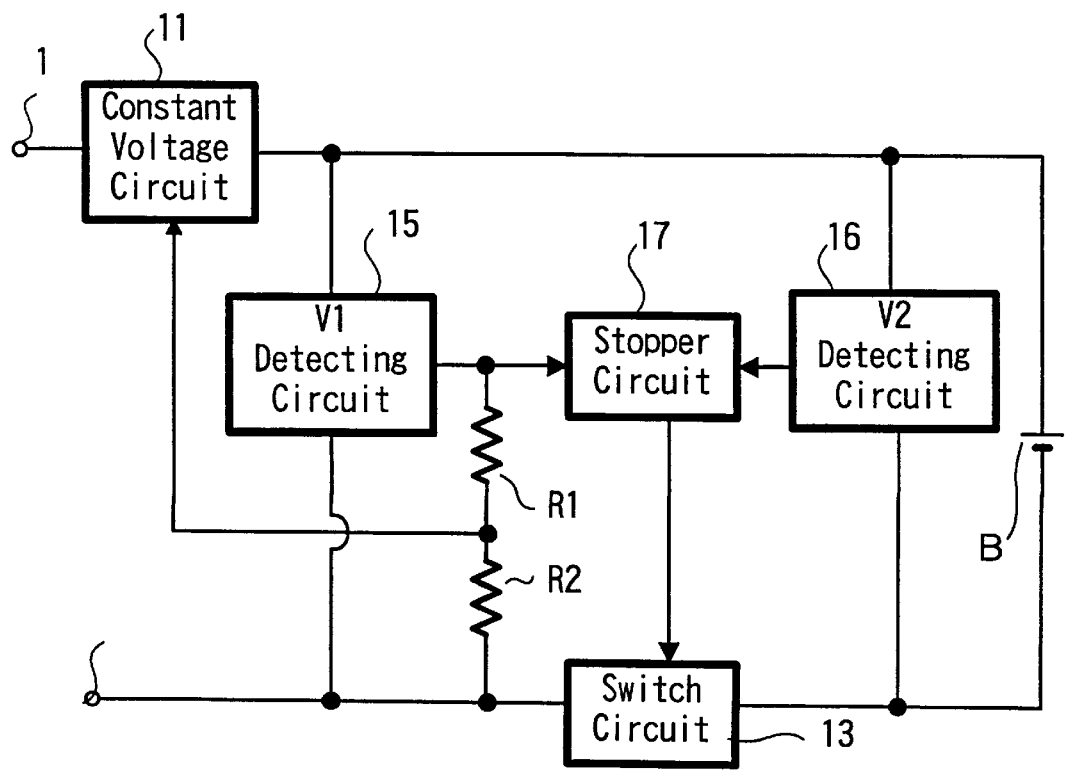
FIG. 8 is a block diagram showing a secondary battery pack according to a third embodiment of the present invention.
Figure 9:
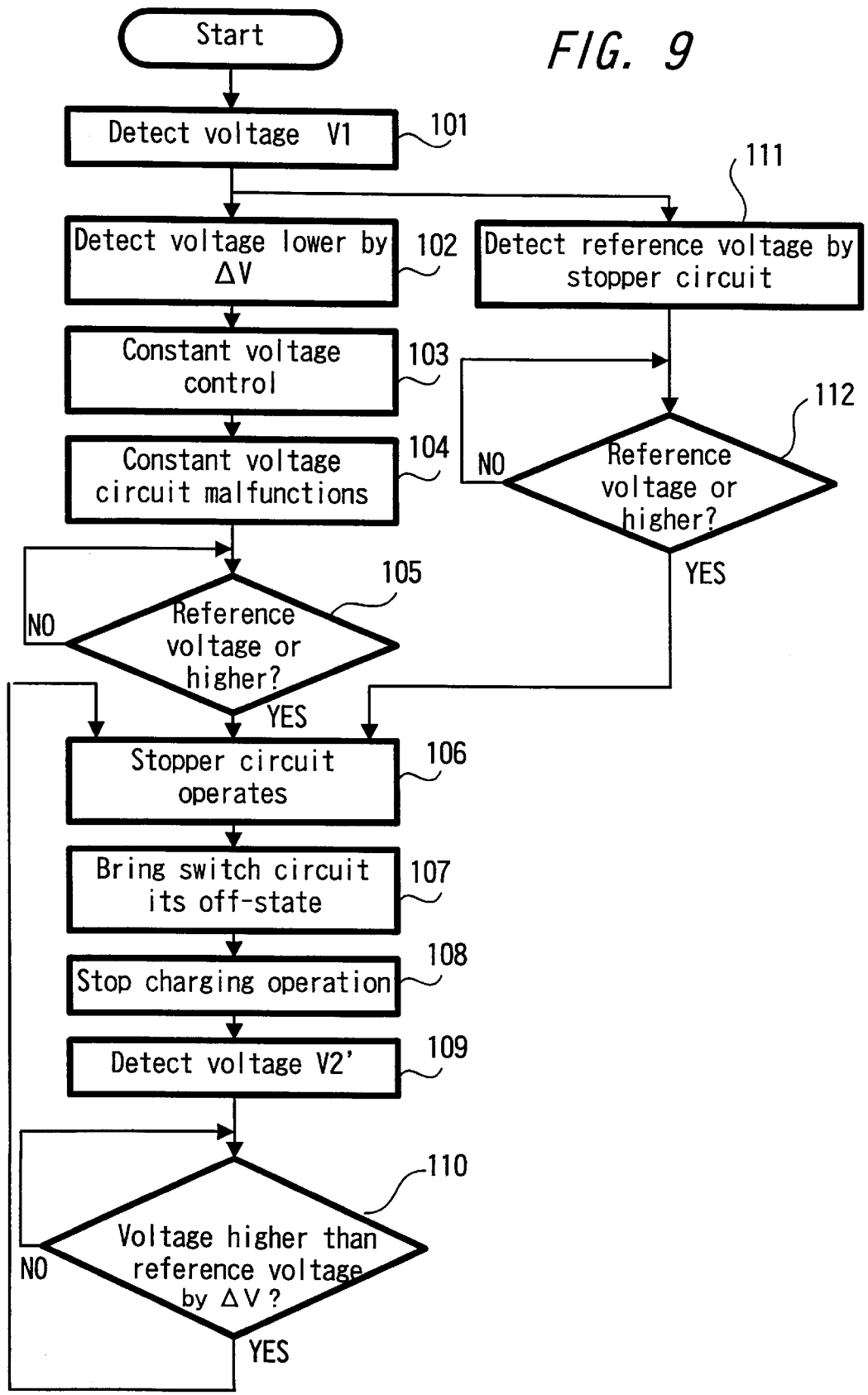
FIG. 9 is a flowchart showing a processing of the secondary battery pack according to the third embodiment of the present invention.

A secondary battery pack according to a third embodiment of the present invention will be described with reference to FIGS. 8 and 9. In FIGS. 8 and 9, like parts corresponding to those shown in FIGS. 4 and 5 are marked with the same references and hence need not to be described in detail. FIG. 8 is a block diagram showing an arrangement of the secondary battery pack according to the third embodiment. In the second embodiment, two voltage detecting circuits, i.e., a voltage detecting circuit 15 for detecting a voltage V1 (hereinafter referred to as a V1 detecting circuit) and a voltage detecting circuit 16 for detecting a voltage V2 (hereinafter referred to as a V2 detecting circuit) are provided. In this case, the voltages V1 and V2 are set so as to satisfy a relation of V1<V2. The V1 detecting circuit 15 detects a voltage applied from the constant voltage circuit 11 to the secondary battery B. The V2 detecting circuit 16 detects a battery voltage of the secondary battery B. The voltage V1 detected by the V1 detecting circuit 15 is fundamentally similar to the reference voltage detected by the voltage detecting circuit 12 described in the first embodiment. The voltage V2 detected by the V2 detecting circuit 16 is slightly higher than the voltage V1.

A detection output from the voltage detecting circuit 15 for detecting the voltage V1 is supplied directly to a stopper circuit 17. The stopper circuit 17 controls the protecting operation by bringing the switch circuit 13 in its connected or disconnected state. The constant voltage circuit 11 is controlled by using a voltage obtained by lowering the detection output from the voltage detecting circuit 15 by a predetermined voltage ΔV from the reference voltage by voltage division of the resistors R1, R2.

Moreover, a detection output from the voltage detecting circuit 16 for detecting the voltage V2 is supplied to the stopper circuit 15. The protecting operation can also be controlled by bringing the connected or disconnected state of the switch circuit 13 based on the detection output from the voltage detecting circuit 16.

A processing of the arrangement of the third embodiment will be described with reference to FIG. 9 which is a flowchart therefor. In this flowchart, the processings in steps 101 to 108, 111 and 112 are fundamentally similar to those in the flowchart of FIG. 6.

The processing of the arrangement of the third embodiment will hereinafter be described. In step 101, when a DC power source for a charging operation is supplied from the outside to the terminals 1, 2, the V1 detecting circuit 15 detects a voltage. Then, in this voltage detecting process, a process in step 102 of detecting a detection voltage lowered by a predetermined voltage ΔV from a reference voltage by voltage division by the resistors R1, R2 and a process in step 111 in which the stopper circuit 17 detects a voltage with reference to the reference voltage are simultaneously carried out. In the process in step 102 of detecting a detection voltage lowered by the predetermined voltage ΔV from a reference voltage, the constant voltage circuit 11 controls a voltage to be a constant voltage, and then the secondary battery B is charged with a constant voltage (in step 103). When it is detected in step 104 that the constant voltage circuit 11 malfunctions due to some factor, if it is determined in step 105 that a voltage equal to or higher than the reference voltage is applied, then the stopper circuit 14 is operated in step 106 to bring the switch circuit 13 to its off-state (disconnected state) in step 107. Then, the charging operation is stopped in step 108. The above processings are similar to those of the first embodiment.

After the above processings are finished, the V2 detecting circuit 16 detects the voltage V2 in step 109. When it is detected in step 110 that the voltage is a voltage higher than the reference voltage (voltage V1) by a predetermined value, the processing returns to step 106, in which the stopper circuit 14 is operated to thereby carry out the charging operation stopping processings by bringing the switch circuit to its off-state.

If it is determined in step 112 that the voltage equal to or higher than the reference voltage is applied in the process in step 111 in which the stopper circuit 14 detects a voltage with reference to the reference voltage, then the process proceeds to step 106, in which the stopper circuit 14 is operated to bring the switch circuit 13 to its off-state in step 107. Then, the charging operation is stopped in step 108. Even when the above processings are carried out, the V2 detecting circuit 16 detects the voltage V2 in step 109. When it is detected in step 110 that the voltage is a voltage higher than the reference voltage (voltage V1) by a predetermined value, the processing returns to step 106, in which the stopper circuit 14 is operated to thereby carry out the charging operation stopping process by bringing the switch circuit to its off-state.

According to the secondary battery pack of the third embodiment, even when the voltage detected by the V1 detecting circuit 15 exceeds the reference voltage or when the switch circuit 13 is prevented from being brought to its disconnected state due to some malfunction, the V2 detecting circuit 16 detects the voltage to be higher than the voltage V1, which allows the switch circuit 13 to be brought to its disconnected state. Moreover, it is possible to carry out the protecting operation more reliably.

Figure 10:
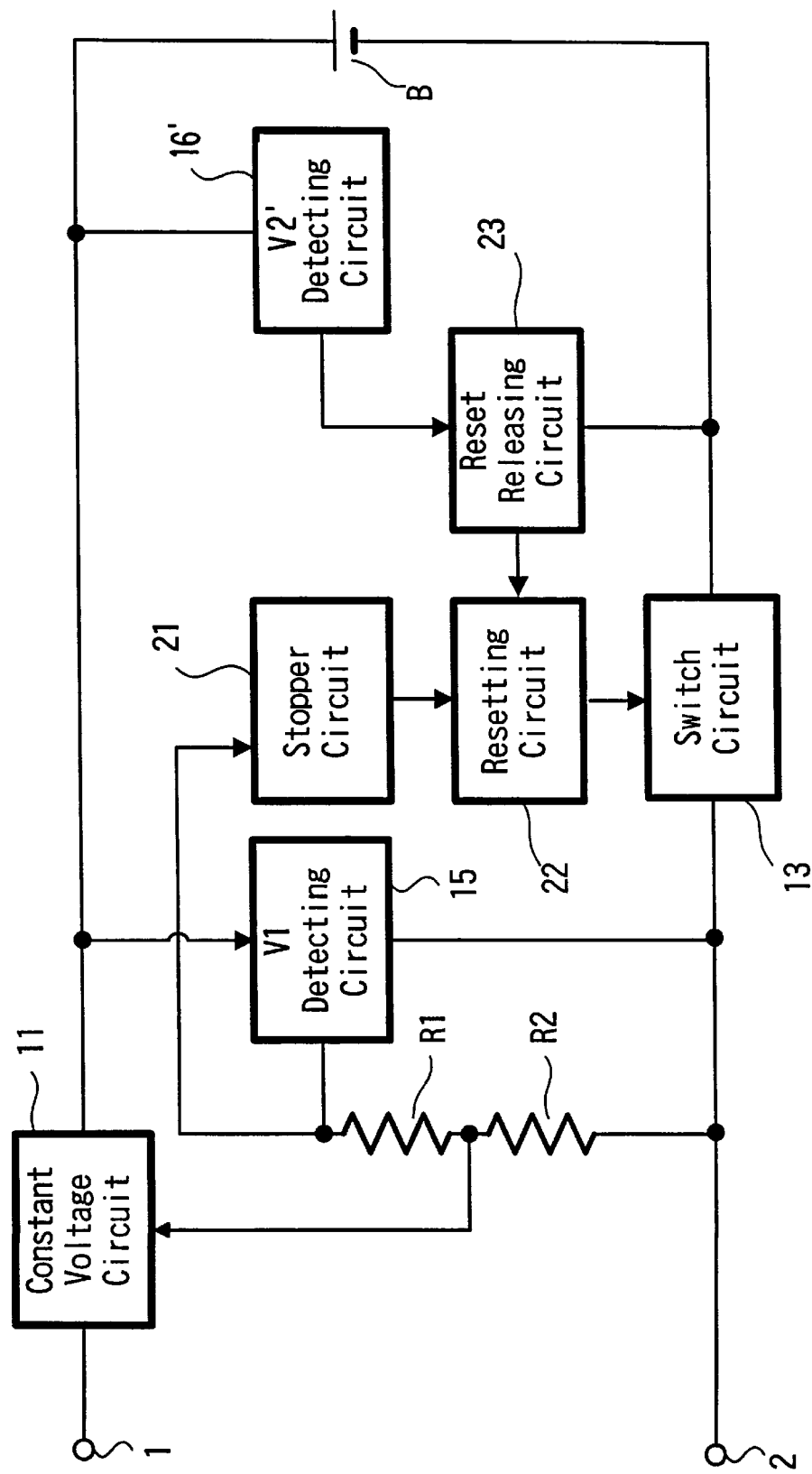
FIG. 10 is a block diagram showing a secondary battery pack according to a fourth embodiment of the present invention.
Figure 11:
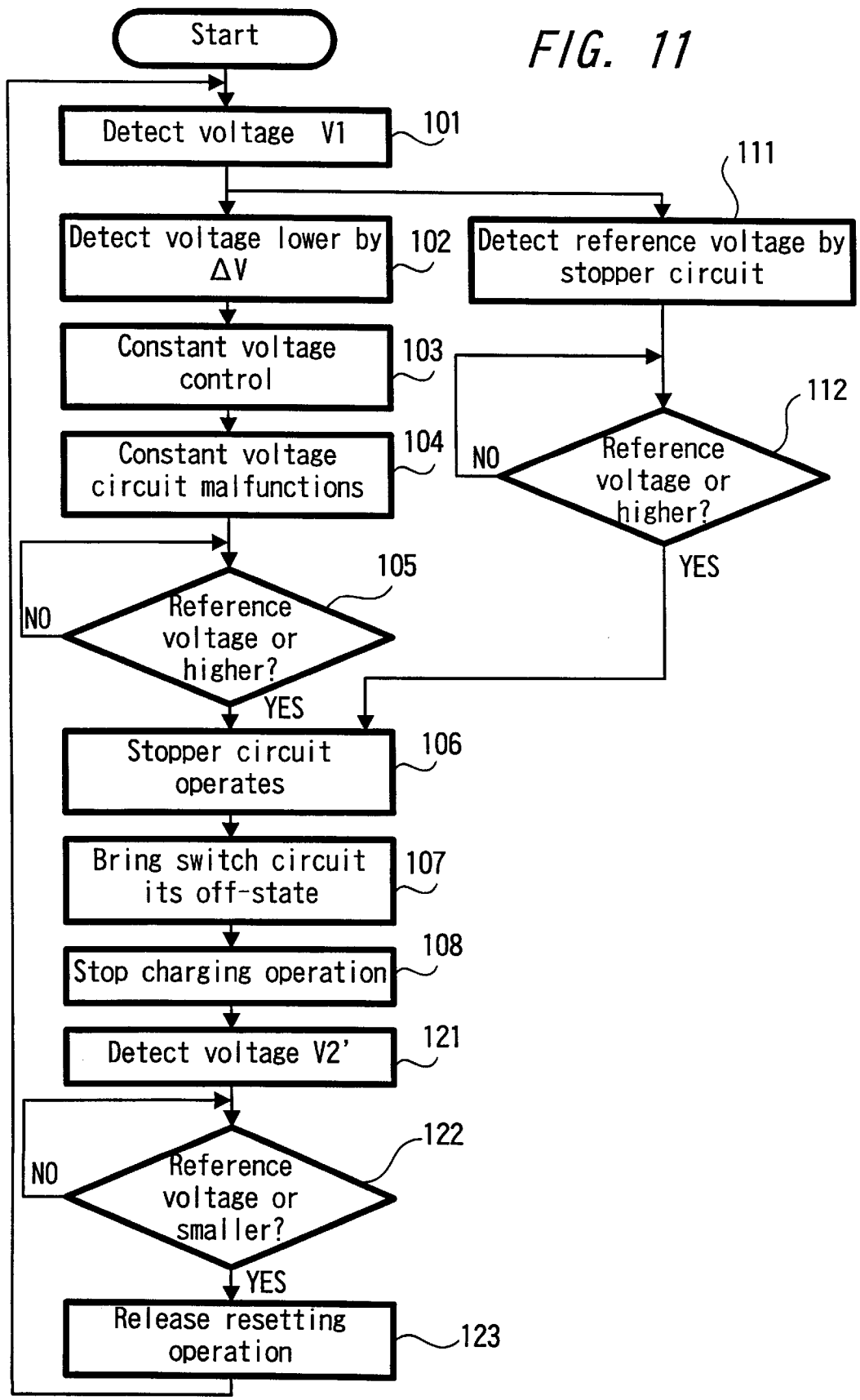
FIG. 11 is a flowchart showing a processing of the secondary battery pack according to the fourth embodiment of the present invention.

A secondary battery pack according to a fourth embodiment of the present invention will be described with reference to FIGS. 10 and 11. In FIGS. 10 and 11, like parts corresponding to those shown in FIGS. 4 and 5 are marked with the same references and hence need not be described in detail. FIG. 10 is a block diagram showing an arrangement of the secondary battery pack according to the fourth embodiment. In the second embodiment, two voltage detecting circuits, i.e., a voltage detecting circuit 15 for detecting a voltage V1 (hereinafter referred to as a V1 detecting circuit) and a voltage detecting circuit 16' for detecting a voltage V2' (hereinafter referred to as a V2' detecting circuit) are provided. In this case, the voltages V1 and V2' are set so as to satisfy a relation of V1>V2'. The V1 detecting circuit 15 detects a voltages applied from the constant voltage circuit 11 to the secondary battery B. The V2' detecting circuit 16' detects a battery voltage of the secondary battery B. The voltage V1 detected by the V1 detecting circuit 15 is fundamentally similar to the reference voltage detected by the voltage detecting circuit 12 described in the first embodiment. The voltage V2' detected by the V2' detecting circuit 16' is slightly lower than the voltage V1.

A detection output from the voltage detecting circuit 15 for detecting the voltage V1 is supplied directly to a stopper circuit 21. The stopper circuit 17 controls the protecting operation by bringing the switch circuit 13 to its connected or disconnected state. The constant voltage circuit 11 is controlled by using a voltage obtained by lowering the detection output from the voltage detecting circuit 15 by a predetermined voltage ΔV from the reference voltage by voltage division of the resistors R1, R2.

Moreover, a detection output from the voltage detecting circuit 16' for detecting the voltage V2' is supplied to a reset releasing circuit 23. When the voltage V2' is detected when the switch circuit 113 is set in its disconnected state, the reset releasing circuit 23 carries out resetting processing to set the switch circuit 13 to its connected state.

A processing of the arrangement of the fourth embodiment will be described with reference to FIG. 11 which is a flowchart therefor. In this flowchart, the processings in steps 101 to 108, 111 and 112 are fundamentally similar to those in the flowchart of FIG. 6.

The processing of the arrangement of the third embodiment will hereinafter be described. In step 101, when a DC power source for a charging operation is supplied from the outside to the terminals 1, 2, the V1 detecting circuit 15 detects a voltage. Then, in this voltage detecting process, a process in step 102 of detecting a detection voltage lowered by a predetermined voltage ΔV from a reference voltage by voltage division by the resistors R1, R2 and a process in step 111 in which the stopper circuit 21 detects a voltage with reference to the reference voltage are simultaneously carried out. In the process in step 102 of detecting a detection voltage lowered by the predetermined voltage ΔV from a reference voltage, the constant voltage circuit 11 controls a voltage to be a constant voltage, and then the secondary battery B is charged with a constant voltage (in step 103). When it is detected in step 104 that the constant voltage circuit 11 malfunctions due to some factor, if it is determined in step 105 that a voltage equal to or higher than the reference voltage is applied, then the stopper circuit 14 is operated in step 106 to bring the switch circuit 13 to its off-state (disconnected state) in step 107. Then, the charging operation is stopped in step 108. The above processings are similar to those of the first embodiment.

After the above processings are finished, the V2' detecting circuit 16' detects the voltage V2' in step 121. When it is detected in step 122 that the voltage is a voltage lower than the reference voltage (voltage V1) by a predetermined value, the reset releasing operation is carried out to return the switch circuit 13 to its on-state (connected state). Then, the switch circuit is recovered in step 123.

If it is determined in step 112 that the voltage equal to or higher than the reference voltage is applied in the process in step 111 in which the stopper circuit 14 detects a voltage with reference to the reference voltage, then the process proceeds to step 106, in which the stopper circuit 14 is operated to bring the switch circuit 13 to its off-state in step 107. Then, the charging operation is stopped in step 108. Even when the above processings are carried out, the V2' detecting circuit 16' detects the voltage V2' in step 121. When it is detected in step 122 that the voltage is a voltage lower than the reference voltage (voltage V1) by a predetermined value, the reset releasing operation is carried out to return the switch circuit 13 to its on-state (connected state). Then, the switch circuit is recovered in step 123.

Since the processings of the arrangement of the fourth embodiment are carried out as described above, if a battery voltage is lowered to a certain extent to become a voltage in the normal range after the voltage detected by the V1 detecting circuit 15 exceeds the reference voltage and then the switch circuit 13 serving as the protecting circuit is set in its disconnected state, the switch circuit 13 is returned to its connected state. Therefore, if the cause of the operation of the protecting circuit is eliminated, then the charging operation is automatically started again.

Figure 12:
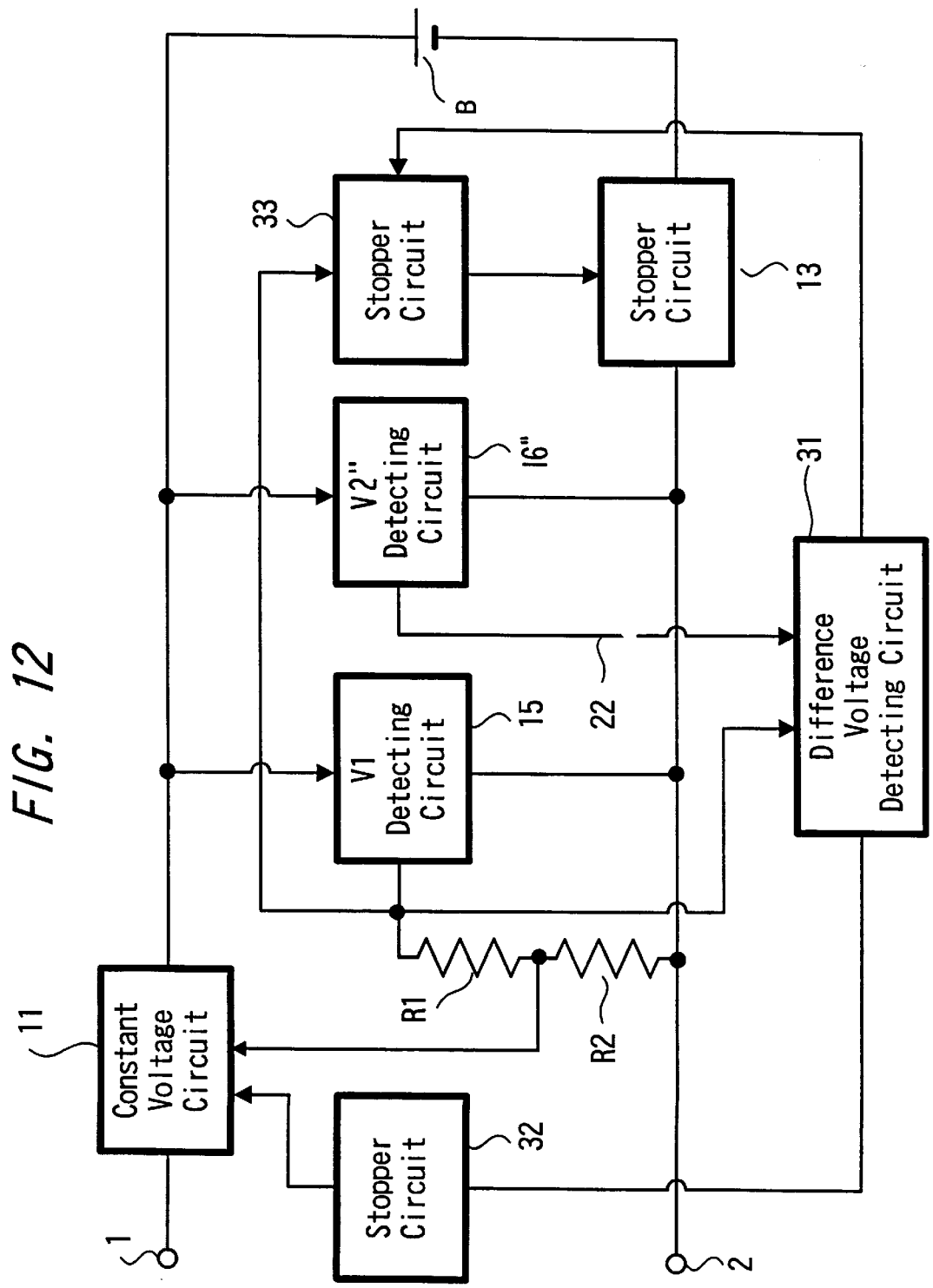
FIG. 12 is a block diagram showing a secondary battery pack according to a fifth embodiment of the present invention.
Figure 13:
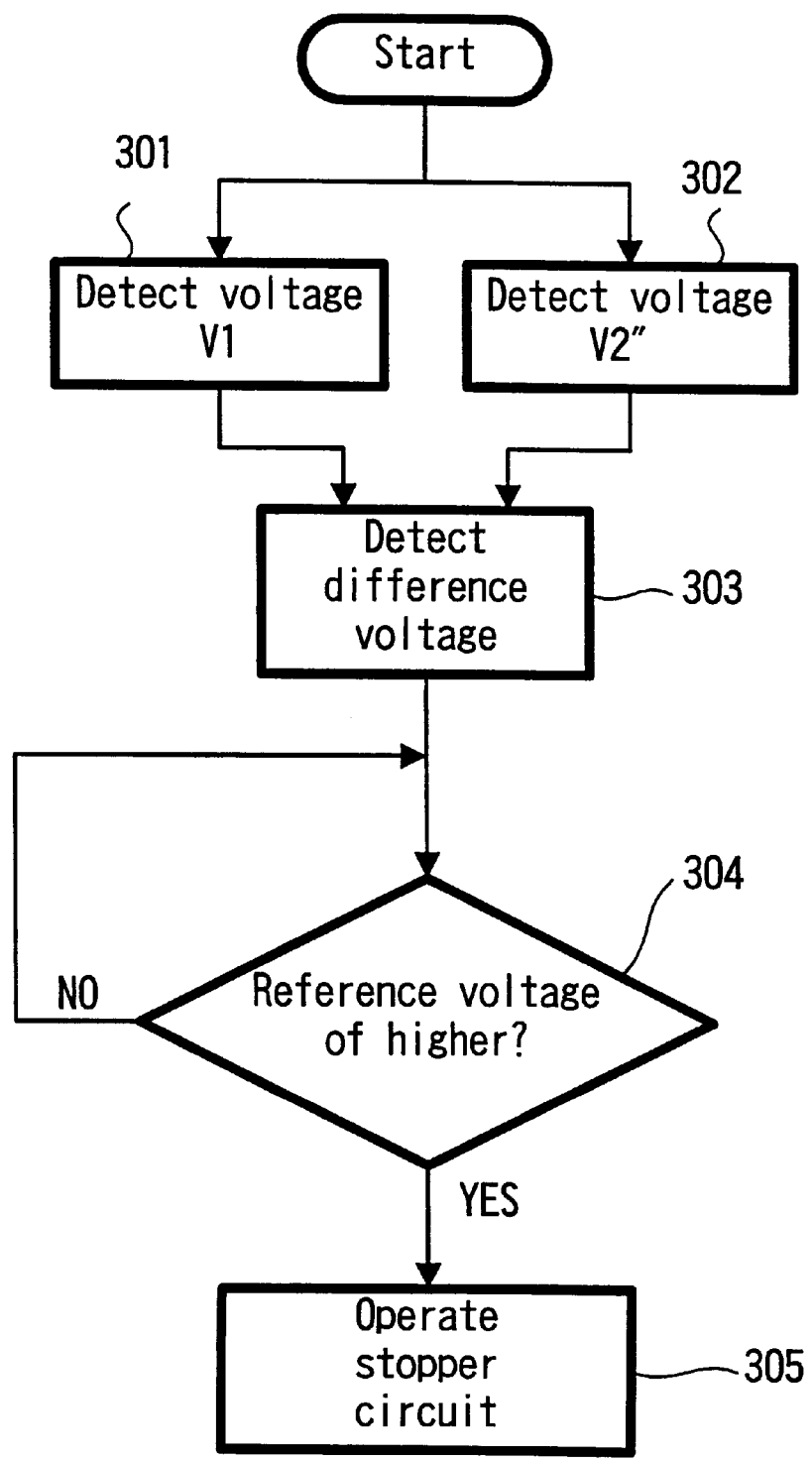
FIG. 13 is a flowchart showing a processing of the secondary battery pack according to the fifth embodiment of the present invention.

A secondary battery pack according to a fifth embodiment of the present invention will be described with reference to FIGS. 12 and 13. In FIGS. 12 and 13, like parts corresponding to those shown in FIGS. 4 to 6 are marked with the same references and hence need not to be described in detail. FIG. 12 is a block diagram showing an arrangement of the secondary battery pack according to the fifth embodiment. In the fifth embodiment, two voltage detecting circuits, i.e., a voltage detecting circuit 15 for detecting a voltage V1 (hereinafter referred to as a V1 detecting circuit) and a voltage detecting circuit 16" for detecting a voltage V2" (hereinafter referred to as a V2" detecting circuit) are provided. In this case, the voltages V1 and V2" are set so as to have substantially the same voltage values. The V1 detecting circuit 15 detects a voltage applied from the constant voltage circuit 11 to the secondary battery B. The V2" detecting circuit 16" detects a battery voltage of the secondary battery B. The switch circuit 13 is provided between a negative side detection input side of the V" detecting circuit 16" and the negative electrode side of the secondary battery B. The voltages V1 and V2" are set similar to the reference voltage detected by the voltage detecting circuit 12 described in the first embodiment.

The constant voltage circuit 11 is controlled by using a voltage obtained by lowering the detection output from the voltage detecting circuit 15 by a predetermined voltage ΔV from the reference voltage by voltage division of the resistors R1, R2. The detection output from the V1 detecting circuit 15 is supplied to a stopper circuit 33 to thereby control the protecting operation by setting the switch circuit 13 in its connected or disconnected state. In this embodiment, the detection output from the V1 detecting circuit 15 and a detection output from the V2" detecting circuit 16" are supplied to a difference voltage detecting circuit 31. The difference voltage detecting circuit 31 detect a difference voltage. If the detected difference voltage is equal to or higher than the predetermined reference voltage, then the stopper circuit 33 is supplied with a signal used for the protecting operation to carry out the protecting operation by setting the switch circuit 13 to its disconnected state. A stopper circuit 32 for controlling the switch means (such as a transistor or the like) in the constant voltage circuit 11 is supplied with a signal used for carrying out the protecting operation, thereby carrying out the protecting operation for stopping the operation of the constant voltage circuit 11.

A processing of the arrangement of the fifth embodiment will be described with reference to FIG. 13 which is a flowchart therefor. In this flowchart, only control processings carried out based on the detection of the difference voltage detecting circuit 31 is shown. The processing for directly controlling the constant voltage circuit 11 and the switch circuit 13 based on only the detection output from the V1 detecting circuit 15 is similar to those described in the first embodiment and so on and hence need not be described in detail.

The processing will be hereinafter be described. When the DC power source for the charging operation is supplied from the outside to the terminal portions 1, 2, the V1 detecting circuit 15 detects the voltage in step 301 and the V2"

detecting circuit 16" detects the voltage i step 302. Then, the difference voltage detecting circuit 31 detects the difference between the voltages detected by the detecting circuits 15 and 16" in step 303. The difference voltage detecting circuit 31 determines in step 304 whether or not the detected difference voltage exceeds the reference value set in the difference voltage detecting circuit 31. If it is determined in step 304 that the detected difference voltages exceeds the reference value, then the stopper circuits 32, 33 are operated to set the switch means in the constant voltage circuit 11 and the switch circuit 13 to their disconnected states in step 305.

The above processings allow the protecting operation to be carried out even when the difference between the voltage applied by the constant voltage circuit 11 to the secondary battery B and the battery voltage of the secondary battery B becomes an abnormal voltage. In this case, the switch means in the constant voltage circuit 11 is also controlled to be set to its off-state, thereby the protecting operation is being carried out in the constant voltage circuit 11. Therefore, it is possible to carry out the protecting operation more reliably.

Figure 14:
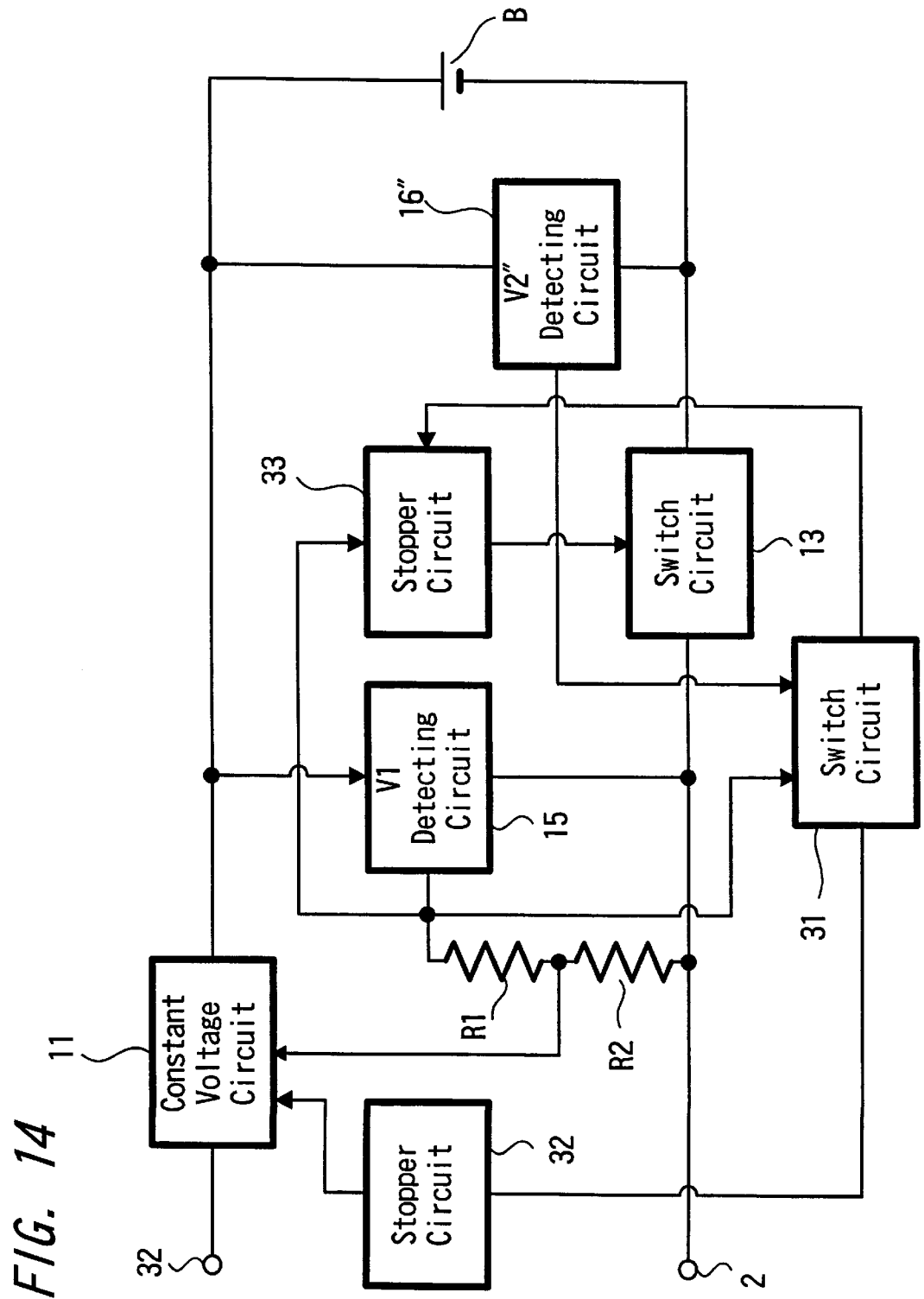
FIG. 14 is a block diagram showing a secondary battery pack according to a sixth embodiment of the present invention.

A secondary battery pack according to a sixth embodiment of the present invention will be described with reference to FIG. 14. In FIG. 14, like parts corresponding to those shown in FIGS. 12 to 13 described in the fifth embodiment are marked with the same references and hence need not be described in detail. FIG. 14 is a block diagram showing an arrangement of the secondary battery pack according to the sixth embodiment. In the sixth embodiment, as compared with the fifth embodiment, a connection position of the V2" detecting circuit 16" for detecting the voltage V2" is changed. Specifically, in the arrangement of the fifth embodiment shown in FIG. 12, the switch circuit 13 is provided between a negative side detection input side of the V2" detecting circuit 16" and the negative electrode side of the secondary battery B. In this embodiment, a positive side detection input side of the V2" detecting circuit 16" is connected directly to the positive electrode side of the secondary battery B, and the negative side detection input side of the V2" detecting circuit 16" is connected directly to the negative electrode side of the secondary battery B, which allows the V2" detecting circuit 16" to directly detect the battery voltage of the secondary battery B. The difference voltage detecting circuit 31 detects the difference voltage between the detection outputs from the V1 detecting circuit 15 and the V2" detecting circuit 16". Based on the value of the difference voltage, the switch means in the constant voltage circuit 11 and the switch circuit 13 are controlled.

Other parts are arranged similarly to those of the fifth embodiment shown in FIG. 12. The control therefor is carried out in accordance with the flowchart shown in FIG. 13. Similarly to the fifth embodiment, the arrangements of the sixth embodiment allows the protecting operation to be carried out even when the difference between the voltage applied by the constant voltage circuit 11 to the secondary battery B and the battery voltage of the secondary battery B becomes an abnormal voltage.

Figure 15:
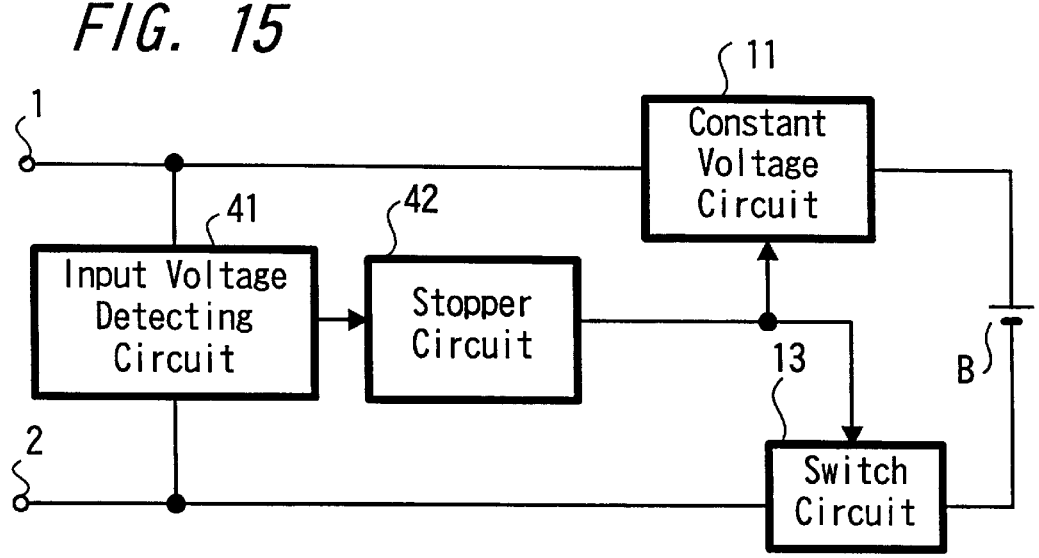
FIG. 15 is a block diagram showing a secondary battery pack according to a seventh embodiment of the present invention.
Figure 16:
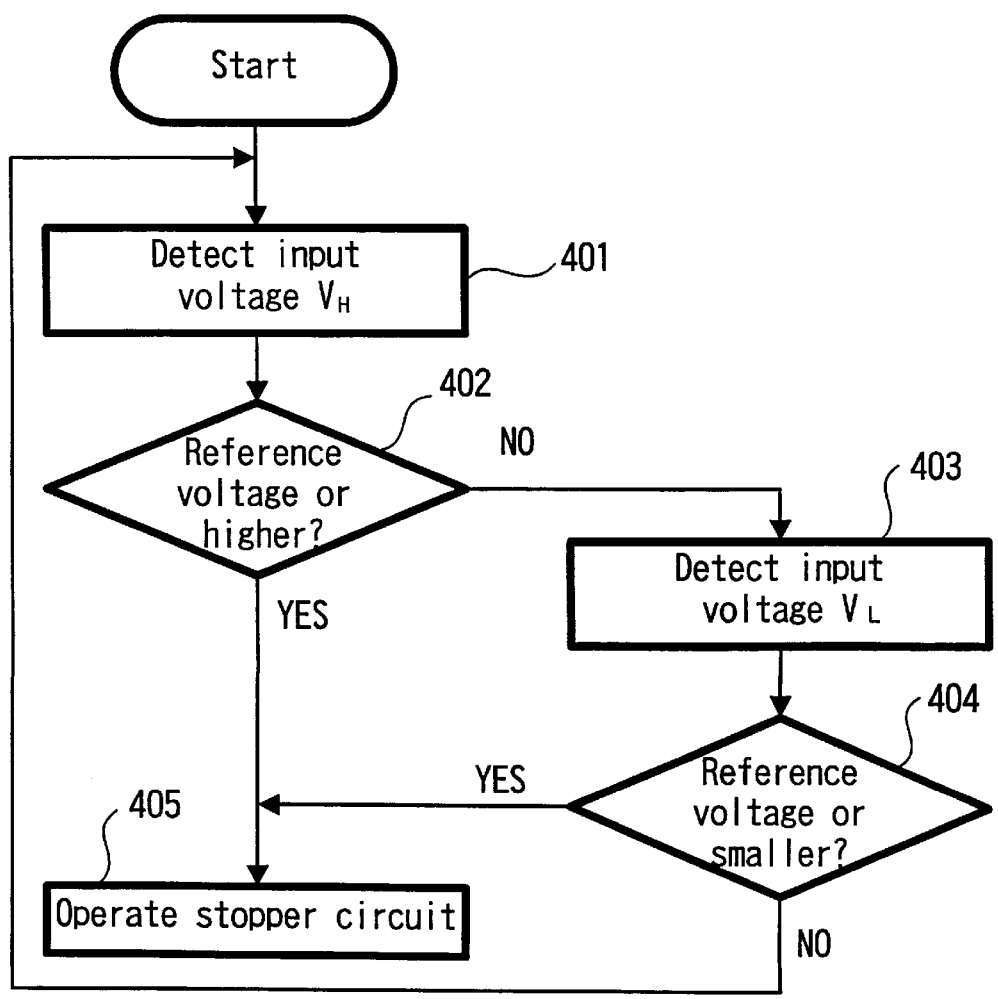
FIG. 16 is a flowchart showing a processing of the secondary battery pack according to the seventh embodiment of the present invention.

A secondary battery pack according to a seventh embodiment of the present invention will be described with reference to FIGS. 15 and 16. In FIGS. 15 and 16, like parts corresponding to those shown in FIGS. 4 to 6 described in the first embodiment are marked with the same references and hence need not to be described in detail. FIG. 15 is a block diagram showing an arrangement of the secondary battery pack according to the seventh embodiment. In the seventh embodiment, the constant voltage circuit 11 and the switch circuit 13 are controlled also by detecting an input voltage. In FIG. 15, an arrangement for controlling the constant voltage circuit 11 and the switch circuit 13 based on the output from the voltage detecting circuit 12 described in the first embodiment shown in FIG. 4 is not shown.

In this embodiment, an input voltage detecting circuit 41 detects a potential between the positive and negative side terminal portions 1 and 2. If it is determined that the detected voltage exceeds a voltage range set by the detecting circuit (in this case, an upper limit value and a lower limit value are set), the detecting circuit 41 supplies a control signal to a stopper circuit 42. Under the control of the stopper circuit 42, the switch means in the constant voltage circuit 11 is set to its off-state (disconnected state) and the switch circuit 13 is also set to its off-state (disconnected state). Other parts are similar to those of the first embodiment shown in FIG. 4.

The processings of the arrangement of the seventh embodiment will be described with reference to FIG. 16 which is a flowchart therefor. This flowchart only shows a control processing carried out based on a detection result of the input voltage detecting circuit 41. Processings of controlling the constant voltage circuit 11 and the switch circuit 13 based on the output voltage of the constant voltage circuit 11 and the output indicative of the detected battery voltage are similar to those of the first embodiment, and hence need not be described in detail.

The processing will hereinafter be described. When the DC power source and the like for the charging operation are supplied from the outside to the terminal portions 1, 2, the input voltage detecting circuit 41 detects an input voltage with reference to an upper limit voltage $V_H$ in the input step 401. If it is determined in step 402 that the input voltage is equal to or higher than the upper limit voltage $V_H$, then under the control of the stopper circuit 42 the constant voltage circuit 11 and the switch circuit 13 are set to their off-states (disconnected states) in step 405. If it is determined in step 402 that the input voltage does not exceed the upper limit voltage $V_H$, then the processing proceeds to step 403, wherein the input voltage detecting circuit 41 detects an input voltage with reference to a lower limit voltage $V_L$ of the input. If it is determined in step 404 that the input voltage does not exceed the lower limit voltage $V_L$, then the processing proceeds to step 405, wherein under the control of the stopper circuit 42 the constant voltage circuit 11 and the switch circuit 13 are set to their off-states (disconnected states).

Such processings allow the constant voltage circuit 11 and the switch circuit 13 to immediately carry out the protecting operation even when the input voltage from a charging device connected to the terminal portions 1, 2 becomes abnormal and when a load device connected to the terminal portions 1, 2 becomes abnormally operated, which makes it possible to carry out the protecting operation more satisfactorily.

Figure 17:
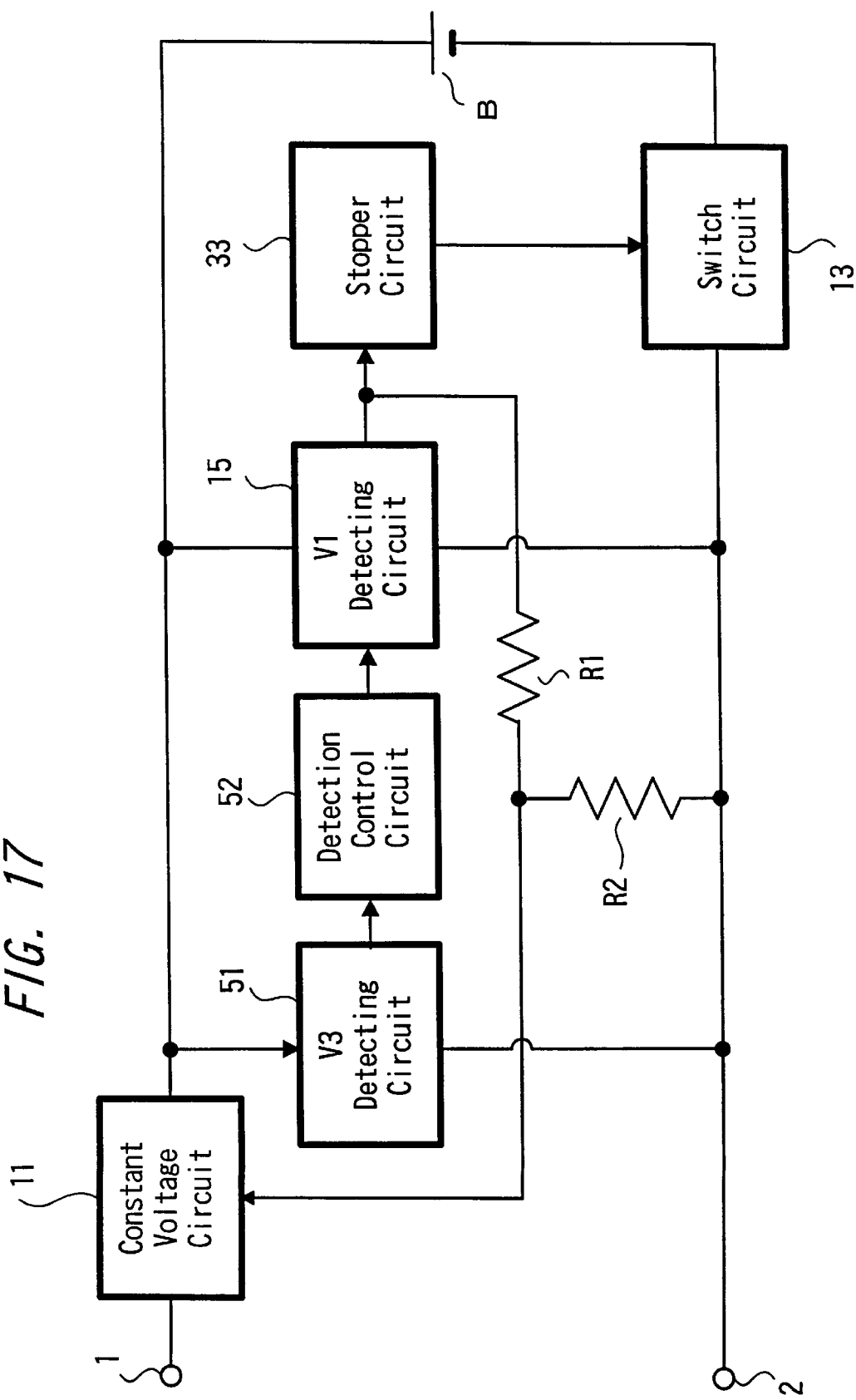
FIG. 17 is a block diagram showing a secondary battery pack according to an eighth embodiment of the present invention.
Figure 18:
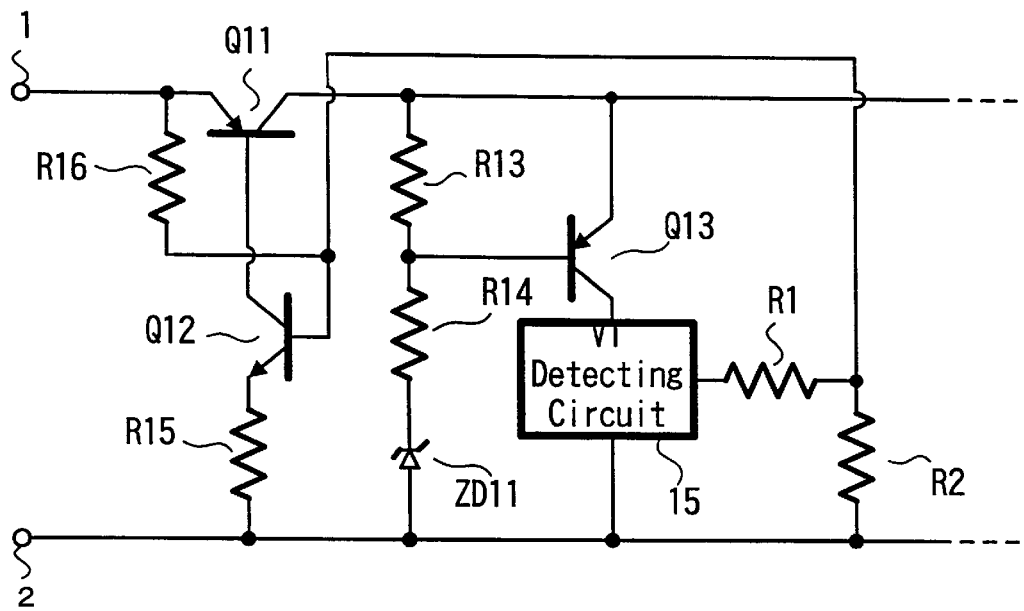
FIG. 18 is a diagram showing a specific circuit arrangement of the secondary battery pack according to the eighth embodiment of the present invention.
Figure 19:
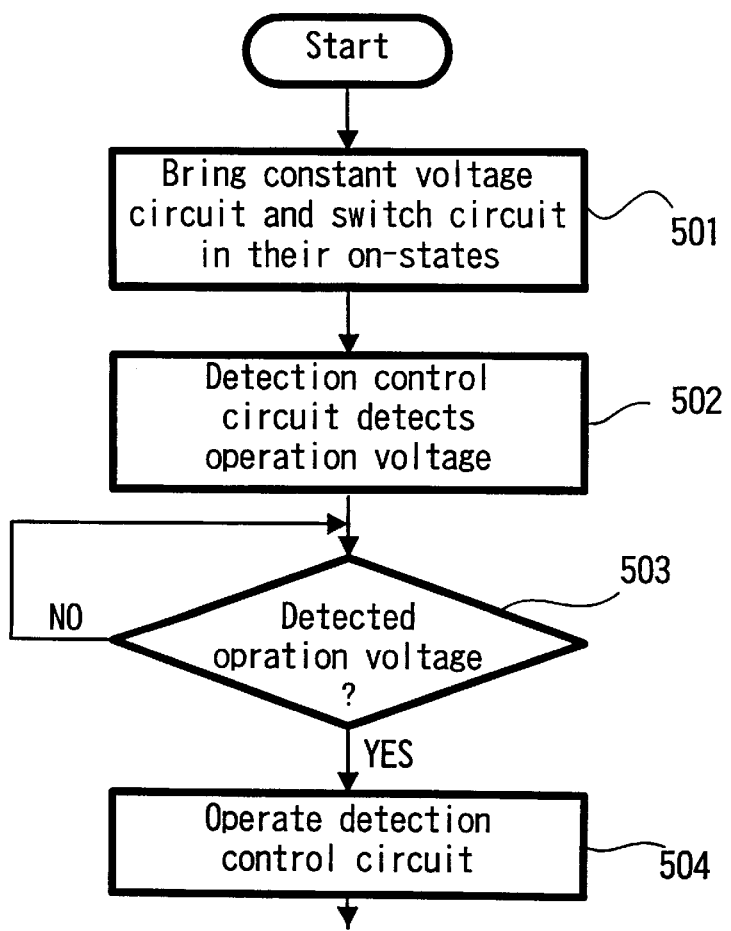
FIG. 19 is a flowchart showing a processing of the secondary battery pack according to the eighth embodiment of the present invention.

A secondary battery pack according to an eighth embodiment of the present invention will be described with reference to FIGS. 17 to 19. In FIGS. 17 to 19, like parts corresponding to those of the first embodiment shown in FIGS. 4 to 6 are marked with the same references and hence need not be described in detail. FIG. 17 is a block diagram showing an arrangement of the secondary battery pack according to the eighth embodiment. In the eighth embodiment, two voltage detecting circuits, i.e., a voltage detecting circuit 15 for detecting a voltage V1 (hereinafter referred to as a V1 detecting circuit) and a voltage detecting circuit 51 for detecting a voltage V3 (hereinafter referred to as a V3 detecting circuit) are provided. In this case, the voltages V1 and V3 are set so as to satisfy a relation of V1>V3. The V1 detecting circuit 15 and the V3 detecting circuit 51 detect a voltages applied from the constant voltage circuit 11 to the secondary battery B. The voltage V1 detected by the V1 detecting circuit 15 is fundamentally similar to the reference voltage detected by the voltage detecting circuit 12 described in the first embodiment. The voltage V3 detected by the V3 detecting circuit 51 is set smaller than the voltage V1, e.g., to a minimum voltage required for the charging operation.

When the V3 detecting circuit 51 detects a voltage equal to or higher than the voltage V3, the V3 detecting circuit 51 supplies a detection signal to a detection control circuit 52. Under the control of the detection control circuit 52, the V1 detecting circuit 15 carries out the detection operation. Accordingly, when the output voltage from the constant voltage circuit 11 or the battery voltage does not exceed the voltage V3, the switch circuit 13 is set to its off-state (disconnected state), thereby the secondary battery B being prevented from being charged and discharged. When the voltage V3 or higher is detected, the protecting processing at the switch circuit 13 based on the voltage V1 detected by the V1 detecting circuit 15 and the processing for controlling the constant voltage circuit 11 by using the voltage obtained by lowering the voltage V1 by a predetermined voltage ΔV by voltage division by the resistors R1, R2 are carried out.

FIG. 18 is a diagram showing a specific circuit arrangement of the secondary battery pack according to the eighth embodiment, showing a circuit arrangement of the V1 detecting circuit 15, the V3 detecting circuit 51 and the constant voltage circuit 11. The switch circuit 13 and the secondary battery B are not shown in FIG. 18. Circuits shown in FIG. 18 will be described. The positive side terminal portion 1 is connected to the positive electrode side of the secondary battery B through an emitter and a collector of the PNP type transistor Q1. The detection output unit of the V1 detecting circuit 15 is connected to the negative side terminal portion 2 through the series circuit formed of the resistors R1, R2. The connection middle point between the resistors R1, R2 is connected to a base of the NPN type transistor Q12. A collector of the transistor Q12 is connected to a base of the transistor Q11. An emitter of the transistor Q12 is connected to the negative side terminal portion 2 through a resistor R15. A predetermined resistor R16 is connected between the base of the transistor Q12 and the emitter of the transistor Q11.

In an arrangement corresponding to the V3 detecting circuit, a series circuit formed of the Zener diode ZD11 and resistors R14, R13 is connected between the negative side terminal portion 2 and the collector of the transistor Q11. A connection middle point between the resistors R14 and R13 is connected to the base of the PNP type transistor Q13. The transistor Q13 is a circuit corresponding to the detection control circuit 52. The emitter and collector of the transistor Q13 are connected between the collector of the transistor Q11 and the positive side voltage detection terminal of the V1 detecting circuit 15. The negative side voltage detection terminal of the V1 detecting circuit 15 is connected directly to the negative side terminal portion 2.

With such arrangement, when the constant voltage V3 or higher is detected in the circuit connected with the Zener diode ZD11, the transistor Q13 is set in its on-state, which allows the V1 detecting circuit 15 to detect the voltage V1, allows the constant voltage circuit formed of the transistor Q11 to be operated, and allows the control of a switch circuit not shown.

A processing of the arrangement according to the eighth embodiment will be described with reference to FIG. 19 which is a flowchart therefor. This flowchart only shows a control processing carried out based on a detection result of the V3 detecting circuit 51. Processings of controlling the constant voltage circuit 11 and the switch circuit 13 based on the output voltage of the constant voltage circuit 11 and the output indicative of the detected battery voltage are similar to those of the first embodiment, and hence need not be described in detail.

Figure 1:
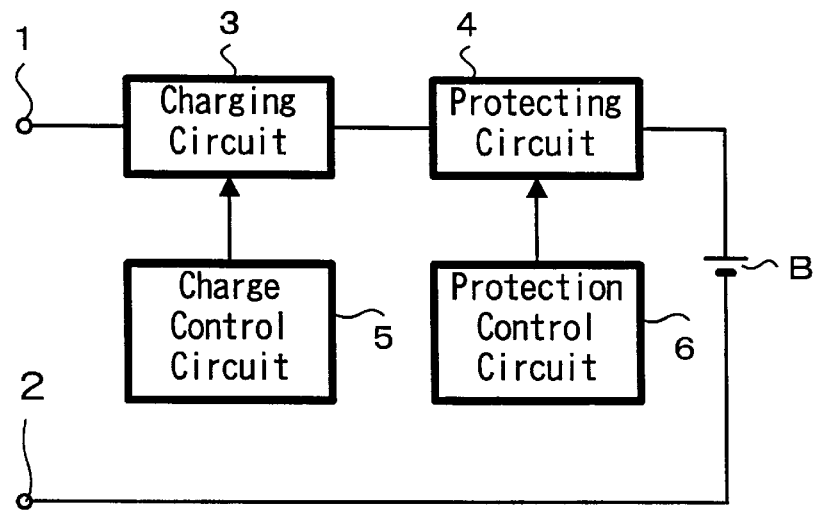
FIG. 1 is a block diagram showing a circuit connected to a secondary battery.
Figure 2:
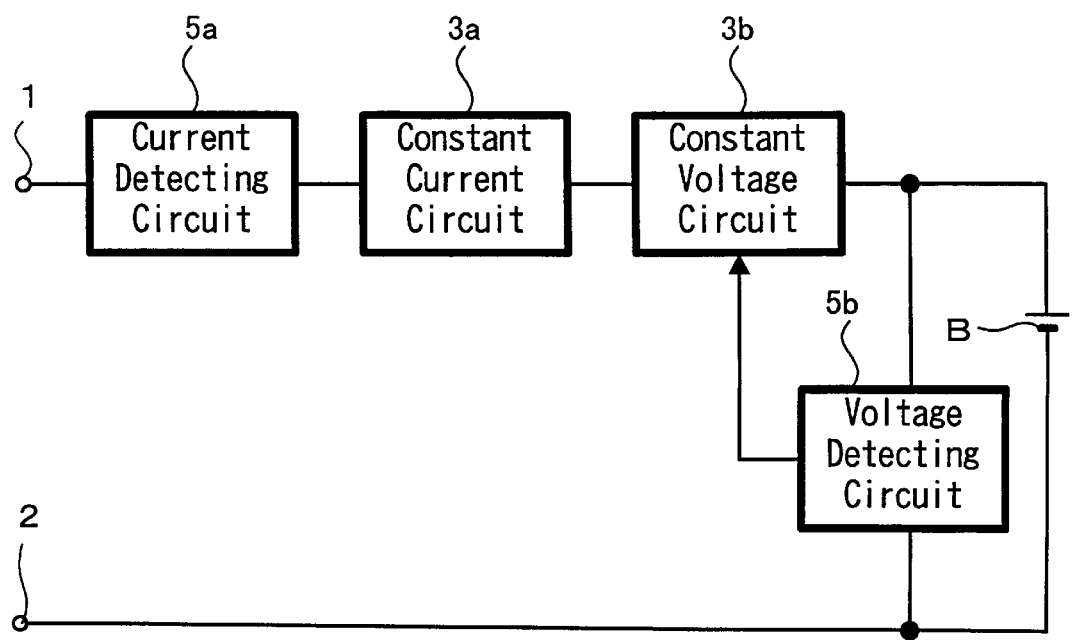
FIG. 2 is a block diagram showing an arrangement of a charging circuit connected to the secondary battery shown in FIG. 1, by way of example.
Figure 3:
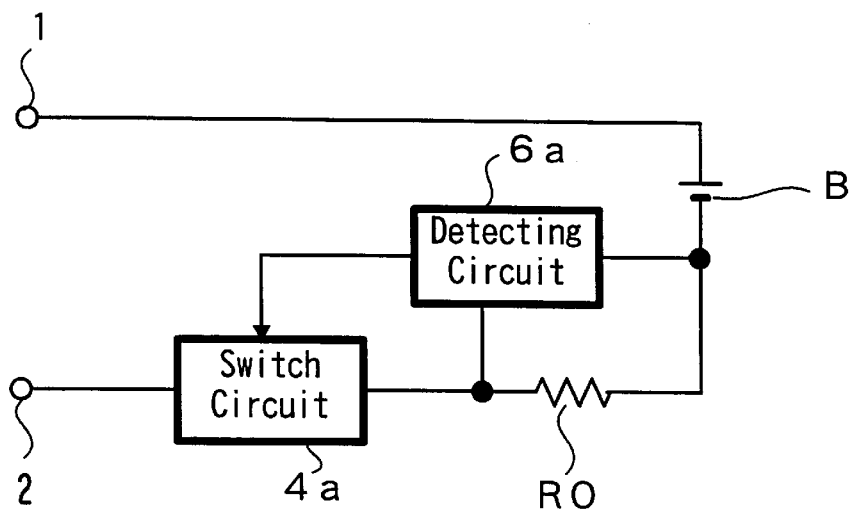
FIG. 3 is a block diagram showing an arrangement of a protecting circuit connected to the secondary battery shown in FIG. 1, by way of example.

The processings will hereinafter be described. When in step 501 the power source is input from the outside to the terminal portions 1, 2 to set the constant voltage circuit 11 and the switch circuit 13 in their on-states, the V3 detecting circuit 51 supplies a detection output to the detection control circuit 52 in step 502. If it is detected in step 503 that the voltage is equal to or higher than the voltage V3, then in step 504 the detection control circuit 52 is operated (the transistor Q13 is brought in its on-state). Thus, the V1 detecting circuit 15 is brought into a state that it can detect the voltage. Thereafter, as shown in FIG. 3 which is a flowchart, the processing for controlling the constant voltage circuit 11 and the switch circuit 13 based on the voltage detected by the V1 detecting circuit 15 is carried out.

Since, as described above, the V3 detecting circuit 51 is provided and the V1 detecting circuit 15 starts detecting the voltage based on the detection output from the V3 detecting circuit 51, it is possible to carry out the constant voltage control and the protecting processing more satisfactorily.

Figure 20:
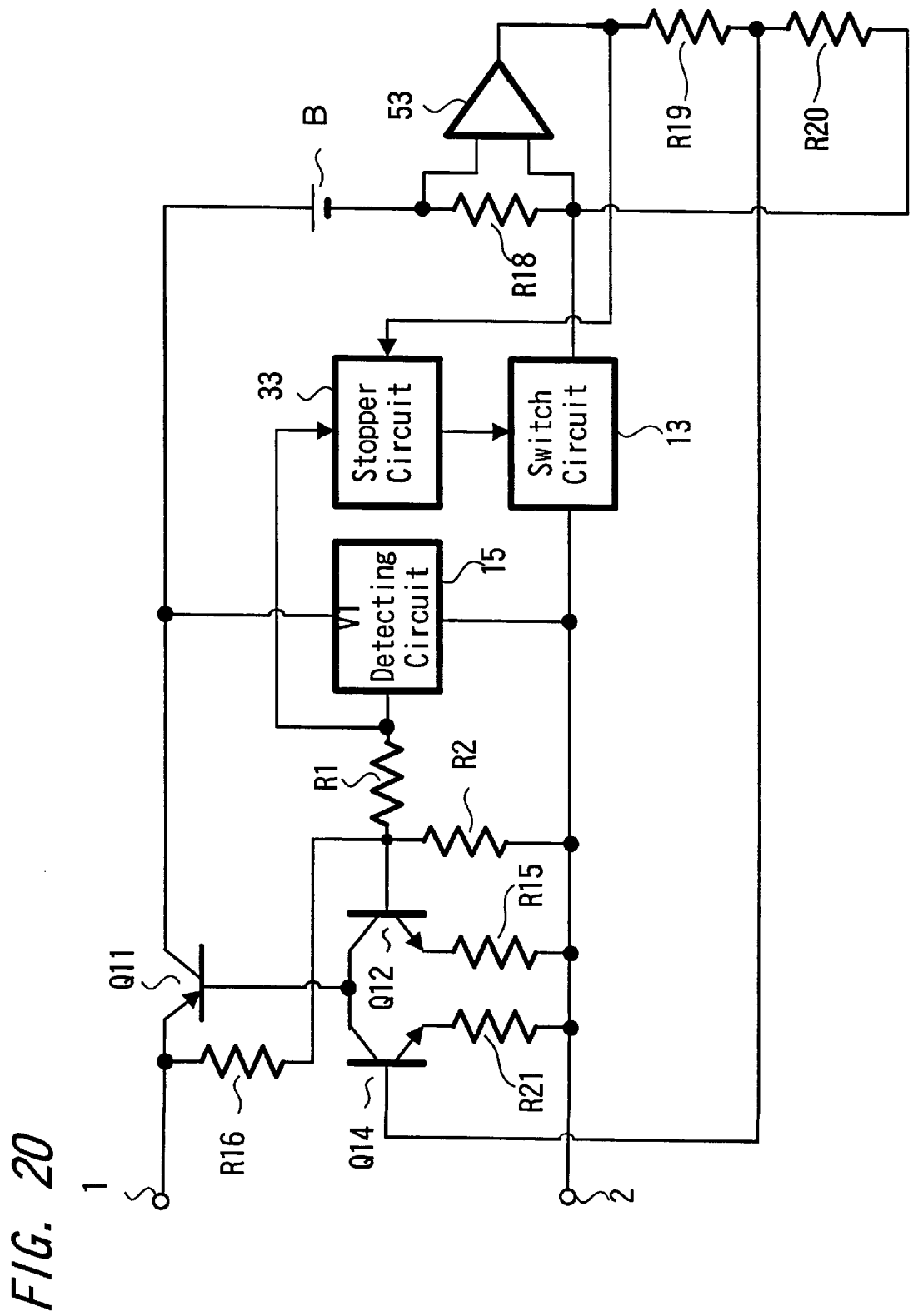
FIG. 20 is a block diagram showing a secondary battery pack according to a ninth embodiment of the present invention.

A secondary battery pack according to a ninth embodiment of the present invention will be described with reference to FIG. 20. In FIG. 20, like parts corresponding to those of the first embodiment shown in FIGS. 4 to 6 are marked with the same references and hence need not to be described in detail. FIG. 20 is a block diagram showing an arrangement of the secondary battery pack according to the ninth embodiment. In the ninth embodiment, the voltage detecting circuit 15 for detecting the voltage V1 used for controlling the constant voltage circuit 11 and the switch circuit 13 (hereinafter referred to as a V1 detecting circuit) is provided, and further a means for detecting a current flowing through the secondary battery B is provided to control the switch means in the constant voltage circuit 11 based on a state of the detected current.

The above arrangement of the ninth embodiment will hereinafter be described. The positive side terminal portion 1 is connected to the positive electrode side of the secondary battery B through the emitter and collector of the PNP type transistor Q11 forming the constant voltage circuit. The negative side of the secondary battery B is connected to the negative side terminal portion 2 through a current detection resistor R18 and the switch circuit 13. The positive side voltage detection terminal of the V1 detecting circuit 15 is connected to the collector of the transistor Q11. The negative side voltage detection terminal thereof is connected to the negative side terminal portion 2. The detection output unit of the V1 detecting circuit 15 is connected to the negative side terminal portion 2 through the series circuit formed of the resistors R1, R2. A connection middle point between the resistors R1, R2 is connected to the base of the NPN type transistor Q12. The collector of the transistor Q12 is connected to the base of the transistor Q11. The emitter of the transistor Q12 is connected to the negative side terminal portion 2 through the resistor R15. A predetermined resistor R16 is connected between the base of the transistor Q12 and the emitter of the transistor Q11.

The detection output from the V1 detecting circuit 15 is supplied to the stopper circuit 33. Under the control of the stopper circuit 33, the switch circuit 13 is controlled. An arrangement for controlling the transistor Q11 forming the constant voltage circuit and the switch circuit based on the detection output from the V1 detecting circuit 15 is similar to those of the first to eighth embodiments.

In the ninth embodiment, a current detecting circuit 53 detects the potential between one end and the other end of the current detection resistor R18 connected to the secondary battery B and a voltage signal proportional to the current flowing through the secondary battery B is obtained from the current detecting circuit 53. An output of the current detecting circuit 53 is fed to the connection between the resistor R18 and the switch circuit 13 through a series circuit formed of resistors R19, R20, and a signal obtained at the output of the current detecting circuit 53 being supplied to the stopper circuit 33. Thus, when the current higher than a predetermined value is detected, the stopper circuit 33 carries out the control processing for setting the switch circuit 13 to its off-state (disconnected state).

A voltage signal obtained at the connection middle point between the resistors R19, R20 is supplied to the base of a transistor Q14. A collector of the transistor Q14 is connected to the base of the transistor Q11 forming the constant voltage circuit. An emitter of the transistor Q14 is connected to the negative side terminal portion 2 through a resistor R21. This connection and arrangement allow the transistor Q11 forming the constant voltage circuit to be controlled in response to the current value detected by the current detecting circuit 53. When it is detected that the current is abnormal, the control processing for setting the transistor Q11 to its off-state is carried out.

Such arrangement allows the constant voltage circuit and the switch circuit to be controlled based on the current flowing through the secondary battery B, which allows the constant voltage circuit and the switch circuit to be operated satisfactorily when the current is not normal and to function as a more satisfactory protecting circuit.

Figure 21:
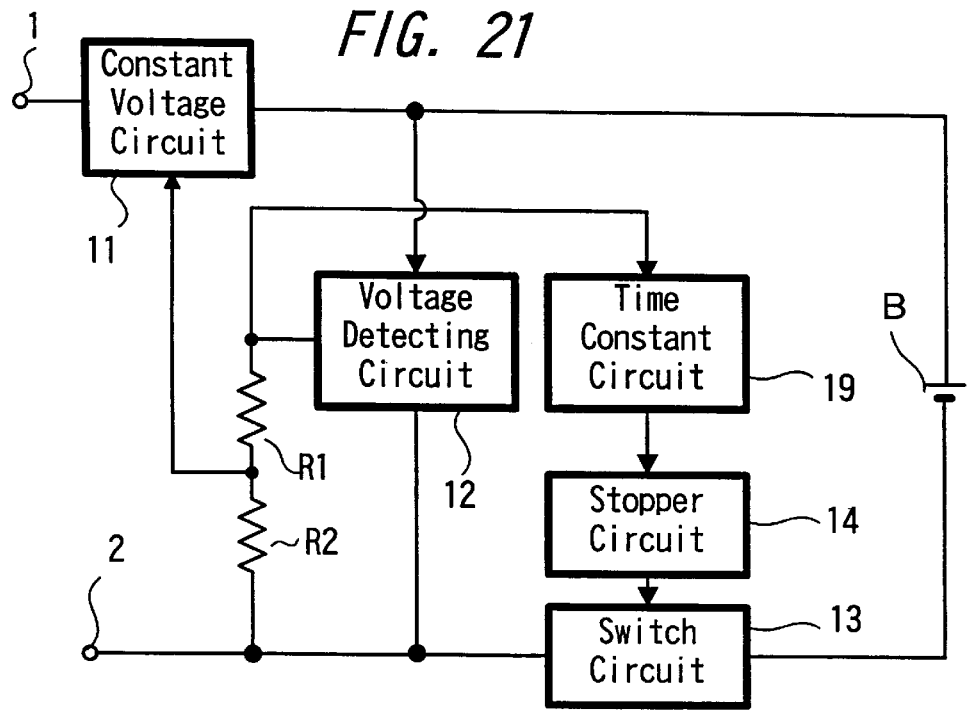
FIG. 21 is a block diagram showing a secondary battery pack according to a tenth embodiment of the present invention.

A secondary battery pack according to a tenth embodiment of the present invention will be described with reference to FIG. 21. In FIG. 21, like parts corresponding to those of the first embodiment shown in FIGS. 4 to 6 are marked with the same references and hence need not to be described in detail. FIG. 21 is a block diagram showing an arrangement of the secondary battery pack according to the tenth embodiment.

According to the tenth embodiment, in the arrangement of the first embodiment shown in FIG. 4, the detection signal from the voltage detecting circuit 12 is supplied through a time constant circuit 19 having a predetermined time constant to the stopper circuit 14. Other parts are similar to those shown in FIG. 4. With such arrangement, a timing at which the stopper circuit 14 controls the switch circuit 13 based on the detection result of the voltage detecting circuit 12 is delayed by a time determined by a time constant of the time constant circuit 19 as compared with a timing at which the constant voltage circuit 11 is controlled based on the detection result of the voltage detecting circuit 12. Therefore, it is possible to prevent the switch circuit 13 from malfunctioning due to a pulse signal and the like.

Figure 22:
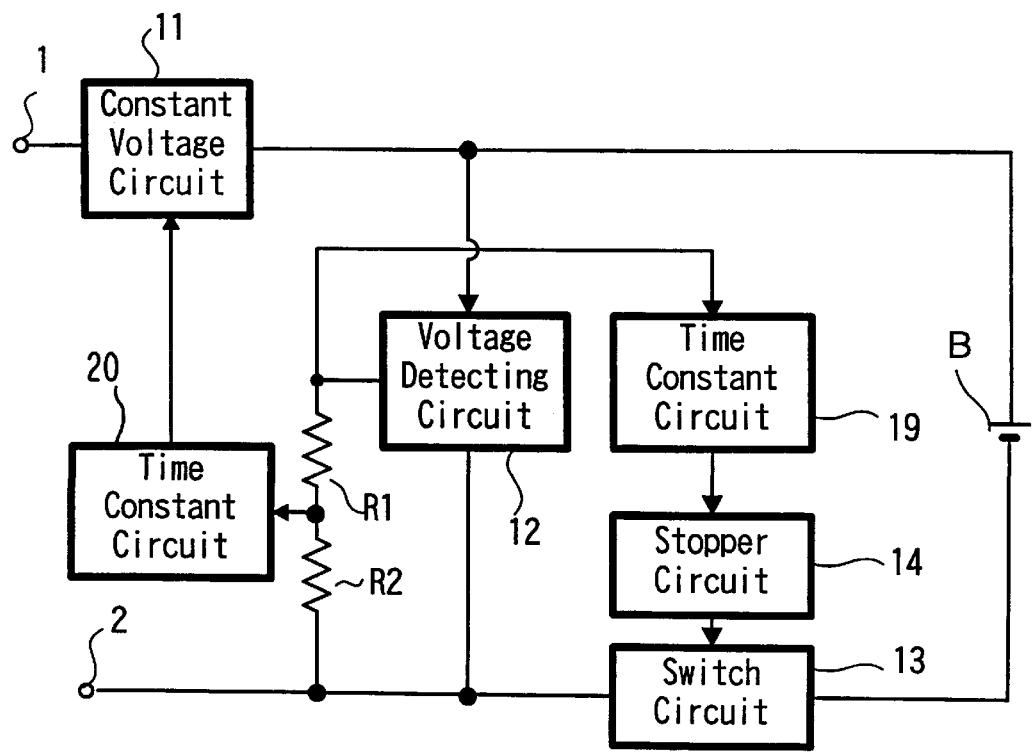
FIG. 22 is a block diagram showing a secondary battery pack according to an eleventh embodiment of the present invention.

A secondary battery pack according to an eleventh embodiment of the present invention will be described with reference to FIG. 22. In FIG. 22, like parts corresponding to those of the first embodiment shown in FIGS. 4 to 6 are marked with the same references and hence need not to be described in detail. FIG. 22 is a block diagram showing an arrangement of the secondary battery pack according to the eleventh embodiment.

According to the eleventh embodiment, in the arrangement of the first embodiment shown in FIG. 4, the detection signal from the voltage detecting circuit 12 is supplied through a time constant circuit 19 having a predetermined time constant to the stopper circuit 14. Moreover, a signal obtained at the connection middle point between the resistors R1, R2 is supplied to the constant voltage circuit 11 through a time constant circuit 20 having a predetermined time constant. In this case, the time constant of the time constant circuit 19 is set longer as compared with the time constant of the time constant circuit 20. Other parts are similar to those shown in FIG. 4. With such arrangement, a timing at which the stopper circuit 14 controls the switch circuit 13 based on the detection result of the voltage detecting circuit 12 is delayed by a time determined by difference between the time constants of the time constant circuits 19 and 20 as compared with a timing at which the constant voltage circuit 11 is controlled based on the detection result of the voltage detecting circuit 12. Therefore, it is possible to prevent the switch circuit 13 from malfunctioning due to a pulse signal and the like.

Figure 23:
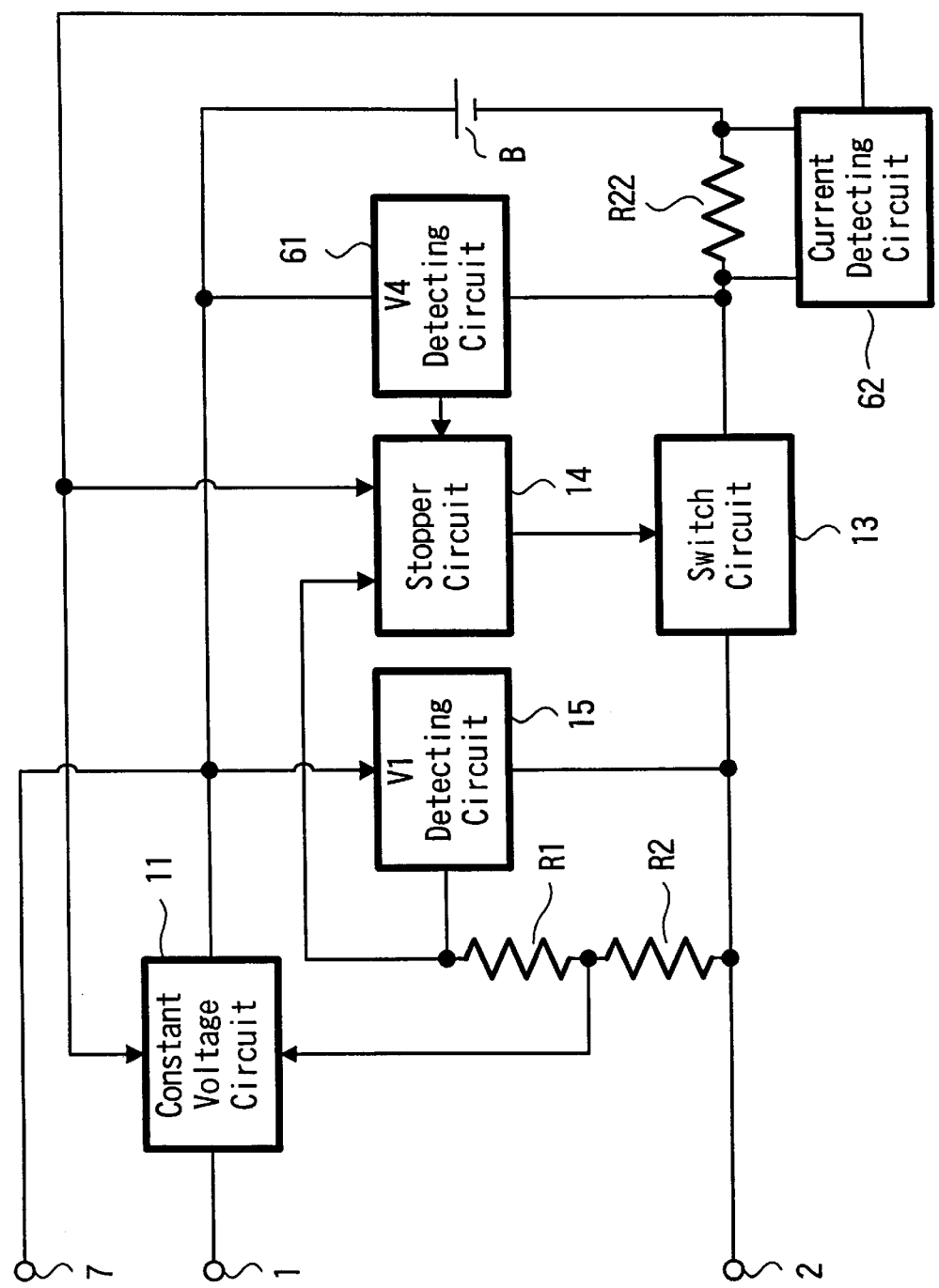
FIG. 23 is a block diagram showing a secondary battery pack according to a twelfth embodiment of the present invention.

A secondary battery pack according to a twelfth embodiment of the present invention will be described with reference to FIG. 23. In FIG. 23, like parts corresponding to those of the first embodiment shown in FIGS. 4 to 6 are marked with the same references and hence need not be described in detail. FIG. 23 is a block diagram showing an arrangement of the secondary battery pack according to the twelfth embodiment.

In the twelfth embodiment, a positive side terminal portion 7 dedicated for the discharging operation is provided with the positive side terminal portion 1 of the positive and negative side terminal portions 1, 2 being employed as a terminal portion only for the charging operation. The positive side charging terminal portion 1 is connected to the positive electrode side of the secondary battery B through the constant voltage circuit 11. The positive side discharging terminal portion 7 is connected directly to the positive electrode side of the secondary battery B. The voltage detecting circuit 15 for detecting an output voltage from the constant voltage circuit 11 (hereinafter referred to as V1 detecting circuit) detects a voltage with reference to the voltage V1 and supplies the detection signal to the stopper circuit 14, thereby controlling the switch circuit 13. The constant voltage circuit 11 is controlled based on a voltage obtained by lowering a voltage of the detection signal by a predetermined voltage ΔV by the resistors R1, R2.

A voltage detecting circuit 61 for detecting a discharge voltage from the secondary battery B (hereinafter referred to as a V4 detecting circuit) is provided and supplies the detection signal to the stopper circuit 14 when detecting that a detected voltage exceeds a reference voltage V4 used for detecting overdischarge. Thus, the control processing for setting the switch circuit 13 to its off-state is carried out.

Moreover, a current detection resistor R22 is connected between the secondary battery B and the switch circuit 13. A potential between the one end of the resistor R22 and the other end thereof is detected by a current detecting circuit 62. If the current detecting circuit 62 determines that the detected current has an excessive current value, the current detecting circuit 62 supplies a detection signal to the stopper circuit 14 and the stopper circuit 14 controls the switch circuit 13 so as to set the switch circuit 13 to its off-state. At the same time, the current detecting circuit 62 supplies the detection signal to the constant voltage circuit 11 to thereby set the switch means to the constant voltage circuit 11 in its off-state.

Such arrangement allows the charging and discharging operations to be controlled with respective proper values.

Figure 24:
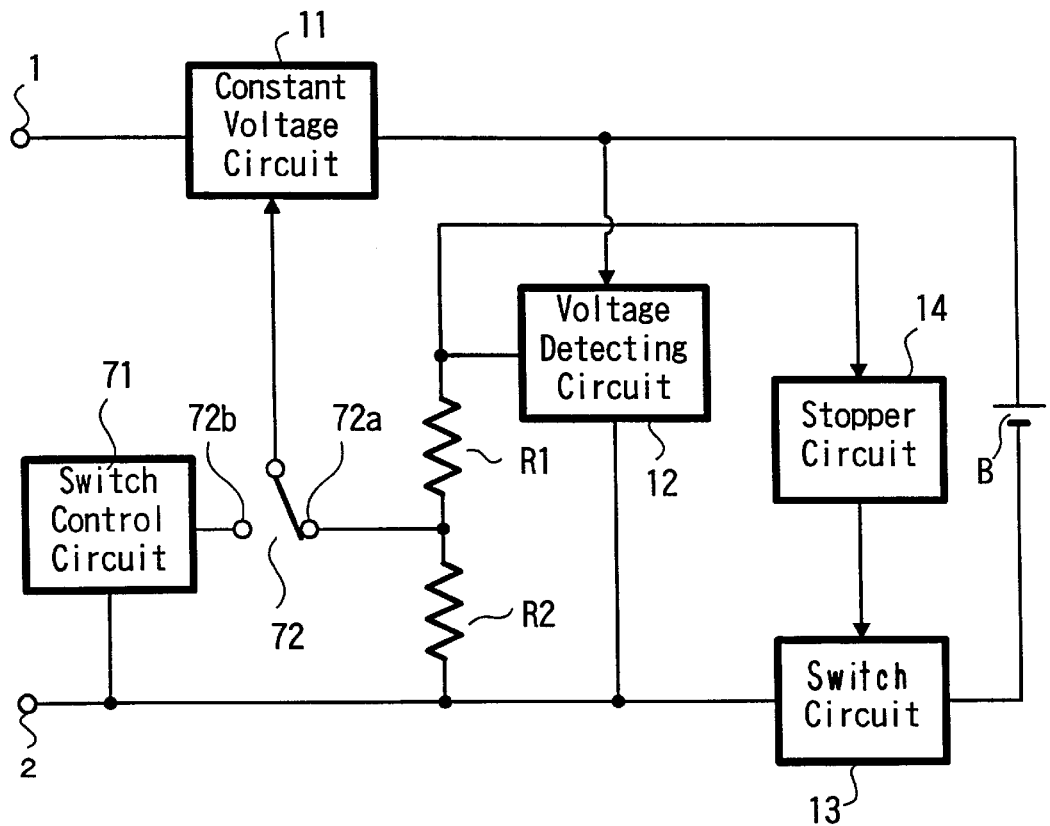
FIG. 24 is a block diagram showing a secondary battery pack according to a thirteenth embodiment of the present invention.
Figure 25:
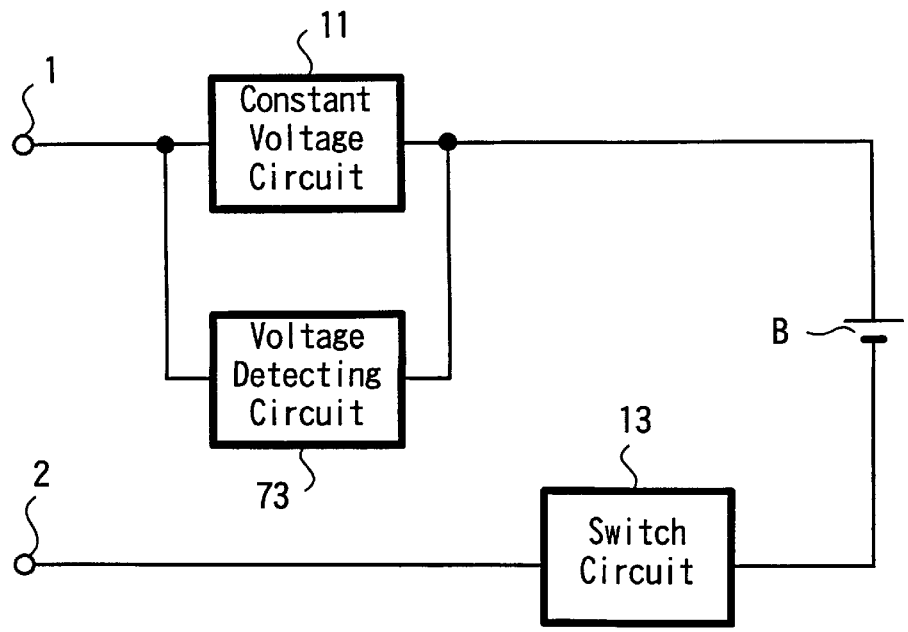
FIG. 25 is a block diagram showing an arrangement for determining whether a secondary battery is charged or discharged, by way of example.
Figure 26:
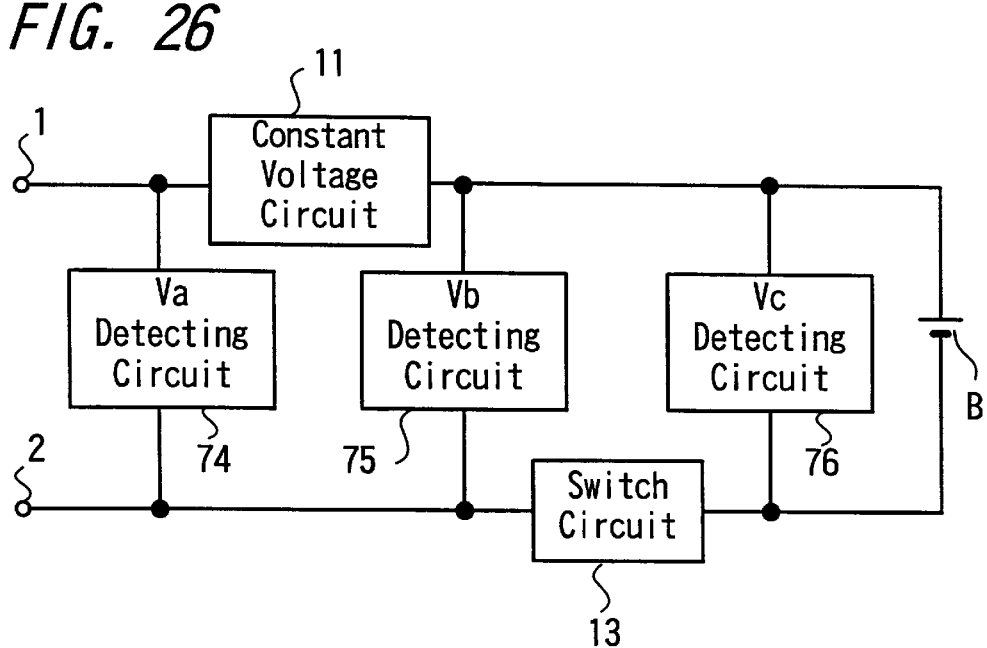
FIG. 26 is a block diagram showing an arrangement for determining whether a secondary battery is charged or discharged, by way of example.

A secondary battery pack according to a thirteenth embodiment of the present invention will be described with reference to FIGS. 24 to 26. In FIGS. 24 to 26, like parts corresponding to those of the first embodiment shown in FIGS. 4 to 6 are marked with the same references and hence need not to be described in detail. FIG. 24 is a block diagram showing an arrangement of the secondary battery pack according to the thirteenth embodiment. In the thirteenth embodiment, a signal obtained by lowering a detection signal from the voltage detecting circuit 12 for detecting an output voltage of the constant voltage circuit 11 by a predetermined voltage ΔV by voltage division by the resisters R1, R2 is supplied to the constant voltage circuit 11 through a changeover switch 72 only when the charging operation is carried out. Upon the discharging operation, an output from a switch control circuit 71 is supplied to the constant voltage circuit 11 through the changeover switch 72.

Specifically, the connection middle point between the resistors R1, R2 is connected to a first fixed contact 72a of the changeover switch 72, and an output unit of the switch control circuit 71 is connected to a second fixed contact of the changeover switch 72. Based on the detection of the charging or discharging operation, the changeover switch 72 is switched. Upon the charging operation, the first fixed contact 72a of the changeover switch 72 is connected to a movable contact thereof, and upon discharging operation, the second fixed contact 72b thereof is connected to the movable contact. The switch control circuit 71 is a circuit for detecting characteristics upon the discharging operation to output a signal for setting the constant voltage circuit 11 to its off-state upon detection of some abnormality.

An arrangement shown in FIG. 25 can be employed as an arrangement for determining whether a mode is a charging mode or a discharging mode. Specifically, a voltage detecting circuit 73 detects a potential difference between the input and output units of the constant voltage circuit 11 and then determines, based on the potential difference, whether the secondary battery B is charged or discharged. For example, if the potential difference is 100 mV or higher, it can be determined that the secondary battery B is charged. If on the other hand the potential difference is 100 mV or smaller, it can be determined that the secondary battery b is discharged.

An arrangement shown in FIG. 26 may be employed to determine whether the secondary battery B is charged or discharged. Specifically, two voltage detecting circuits, i.e., a Va detecting circuit 74 for detecting an input voltage Va obtained at the terminal portions 1, 2 and a Vb detecting circuit 75 for detecting an output voltage Vb of the constant voltage circuit 11 (or a Vc detecting circuit 76 for detecting a battery voltage Vc of the secondary battery B) are provided, thereby making it possible to determine whether the secondary battery B is charged or discharged based on comparison of both voltages detected by the two voltage detecting circuits. For example, if Va>Vb (or Va>Vc) is satisfied, it can be determined that the operation is the charging operation. If on the other hand Va≦Vb (or Va≦Vc) is satisfied, then it can be determined that the operation is the discharging operation.

Since the changeover of the changeover switch 72 shown in FIG. 24 is controlled based on a result of such determination on the charging or discharging operation, it is possible to carry out control operations respectively suitable for the charging operation and the discharging operation.

Figure 27:
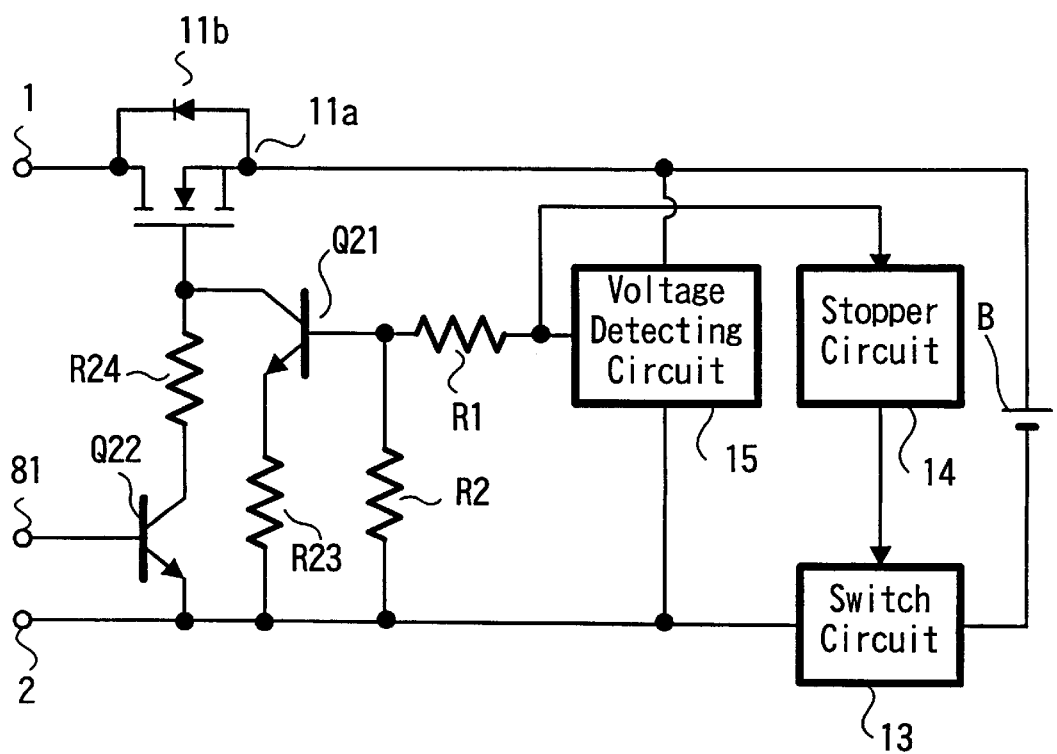
FIG. 27 is a block diagram showing a secondary battery pack according to a fourteenth embodiment of the present invention.

A secondary battery pack according to a fourteenth embodiment of the present invention will be described with reference to FIG. 27. In FIG. 27, like parts corresponding to those of the first embodiment shown in FIGS. 4 to 6 are marked with the same references and hence need not to be described in detail. FIG. 27 is a block diagram showing an arrangement of the secondary battery pack according to the fourteenth embodiment. In the fourteenth embodiment, the constant voltage circuit 11 is controlled based on a charge/discharge control signal obtained from the outside (or a charge/discharge detection signal in the secondary battery pack).

Specifically, a detection signal of the voltage detecting circuit 15 is supplied to the negative side terminal portion 2 through a series circuit formed of the resistors R1, R2. The connection middle point between the resistors R1, R2 is connected to a base of an NPN type transistor Q21. An emitter of the transistor Q21 is connected to the terminal portion 2 through a resistor R23, and a collector thereof is connected to a gate of a field effect transistor 11a forming the constant voltage circuit 11. With this arrangement, the transistor 11a is controlled based on the potential obtained at the connection middle point between the resistors R1, R2, thereby the constant voltage operation being carried out.

In this embodiment, a terminal 81 at which a charge/discharge control signal is obtained from the outside is provided. A signal obtained at the terminal 81 is supplied to a base of the NPN type transistor Q22, and a collector of the transistor Q22 is connected to a gate of the transistor 11a through a resistor R24. An emitter of the transistor Q22 is connected to the negative side terminal portion 2.

With such arrangement, upon the discharging operation, a control signal used for setting the transistor Q22 in its on-state is supplied to the terminal 81, and thereby the transistor 11 forming the constant voltage circuit is not controlled by the output from the voltage detecting circuit 15 and hence kept in its off-state. At this time, the discharging current flows by a parasitic diode 11d of the transistor 11a. Upon the charging operation, a control signal used for setting the transistor Q22 to its of-state is supplied, and thereby the transistor 11a forming the constant voltage circuit can be controlled based on the output from the voltage detecting circuit 15. Thus, the same processing as the processing described in the first embodiment.

While the charge/discharge control signal is supplied from the outside to the terminal 81, as shown in FIGS. 25 and 26, the charge/discharge determination circuit is provided in the secondary battery pack and supplies a signal indicative of a determination result by a determining circuit thereof to the terminal 81.

Figure 28:
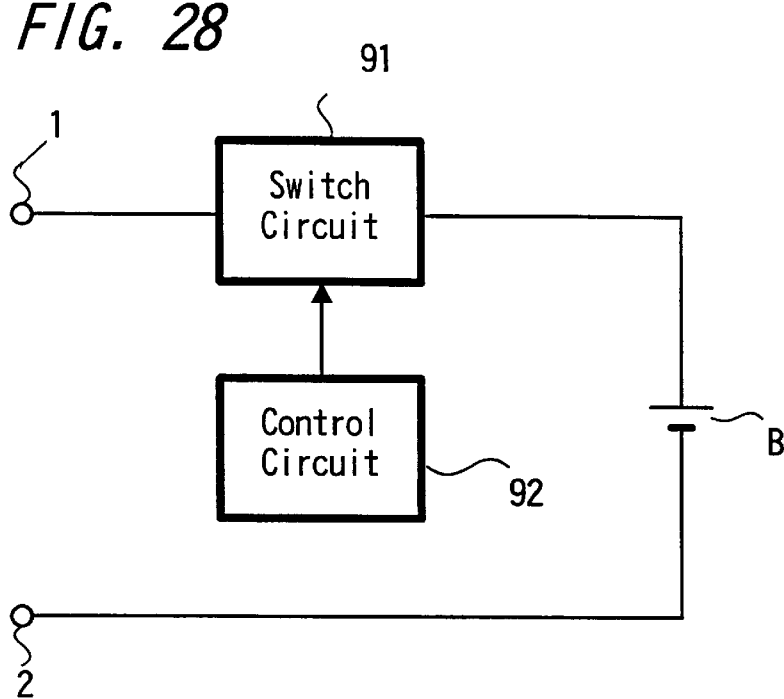
FIG. 28 is a block diagram showing a secondary battery pack according to a fifteenth embodiment of the present invention.
Figure 29:
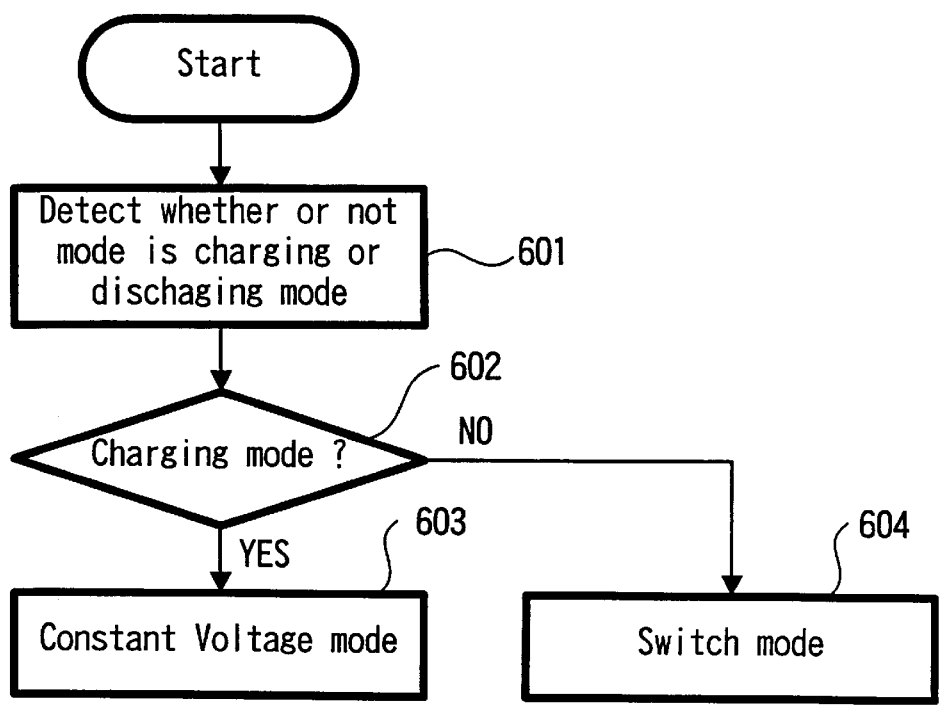
FIG. 29 is a flowchart showing a processing of the secondary battery pack according to the fifteenth embodiment of the present invention.

A secondary battery pack according to a fifteenth embodiment of the present invention will be described with reference to FIGS. 28 and 29. In FIGS. 28 and 29, like parts corresponding to those of the first embodiment shown in FIGS. 4 to 6 are marked with the same references and hence need not to be described in detail. FIG. 28 is a block diagram showing an arrangement of the secondary battery pack according to the fifteenth embodiment. In the fifteenth embodiment, only a switch circuit 91 is provided between the terminal portion 1 or 2 and the secondary battery B. When a control circuit 92 controls the switch circuit 91 so that the switch circuit 91 operates as a constant voltage circuit upon the charging operation and operates as a protecting circuit upon the discharging operation. The switch circuit 91 is formed of a switch means such as a field effect transistor or the like.

FIG. 29 is a flowchart showing a control processing of the control circuit 92. In step 601, it is detected whether the charging or discharging operation is carried out. If it is determined in step 602 that a mode is a charging mode, then in step 603 the switch circuit 91 is operated in its constant voltage mode. If it is determined in step 602 that a mode is a discharging mode, then in step 604 the switch circuit 91 is operated in its switch mode.

Such processing allows the processings upon the charging and discharging operations to be properly carried out only by providing one switch circuit, which allows satisfactory control of the secondary battery with a simple arrangement.

While in each of the drawings showing the embodiments the secondary battery pack houses one secondary battery B, a secondary battery pack having a plurality of secondary batteries connected in series or parallel may be employed.

While in each of the first to fifteen embodiments the lithium ion battery is employed as the secondary battery, the charging circuit and the protecting circuit are incorporated in the secondary battery pack housing the secondary battery, the present invention is not limited thereto and can be applied to an arrangement in which the protecting circuit is incorporated in a charging device independent of the secondary battery.

While in each of the first to fifteen embodiments the lithium ion battery is employed as the secondary battery, the present invention is not limited thereto and can be applied to other secondary battery of lithium system (e.g., a lithium polymer battery or the like), a secondary battery pack employing a secondary battery such as a nickel-hydrogen battery, a nickel-cadmium battery or the like, and a charging device for charging these secondary batteries.

According to a first aspect of the present invention, based on the voltage applied to the secondary battery or the voltage detected by the voltage detecting means for detecting a battery voltage of the secondary battery, the secondary-battery protecting operation at the switch means and the charging operation of the charging circuit can be controlled. Moreover, with a simple arrangement employing the common voltage detecting means as the control means, the secondary battery protecting processing and the secondary battery charging processing can be carried out.

According to a second aspect of the present invention, since the first and second voltages detected by the voltage detecting means are properly set, it is possible to satisfactorily carry out the operation of charging the secondary battery with the constant voltage and the operation of protecting the secondary battery.

According to a third aspect of the present invention, since the first detecting means for detecting the voltage applied to the secondary battery and the second detecting means for detecting the battery voltage of the secondary battery are provided as the voltage detecting means, it is possible to carry out more satisfactory protecting processing.

According to a fourth aspect of the present invention, the first detecting means for detecting the voltage applied to the secondary battery and the second detecting means for detecting the battery voltage of the secondary battery are provided as the voltage detecting means, and the switch means set in its disconnected state is returned based on the detection of the second detecting means. Therefore, it is possible to satisfactorily carry out the processing for returning the switch means to its connected state when the protecting circuit is operated.

According to a fifth aspect of the present invention, the first detecting means for detecting the voltage applied to the secondary battery and the second detecting means for detecting the battery voltage of the secondary battery are provided as the voltage detecting means, and the switch means is controlled based on the difference between potentials detected by both of the first and second detecting means. Therefore, it is possible to carry out the satisfactory protecting operation based on the detection of the potential difference.

According to a sixth aspect of the present invention, since the detection of the potential difference according to the fifth aspect is carried out, the switch means forming the charging circuit is further controlled based on the detection of the potential difference, the more satisfactory protecting operation can be carried out.

According to a seventh aspect of the present invention, the input voltage detecting means for detecting the input voltage is provided between the one terminal portion and the other terminal portion and the switch means and the charging circuit carry out the protecting operation even when the input voltage is equal to or higher than a predetermined voltage. Therefore, it is possible to satisfactorily carry out the protecting operation carried out when the input voltage is abnormal.

According to an eighth aspect of the present invention, since the voltage detecting means is operated to detect the protection voltage and the charge control voltage when the detected voltage exceeds a predetermined voltage, it is possible to prevent the voltage detecting means from malfunctioning when the voltage is low.

According to a ninth aspect of the present invention, since the current detecting means for detecting the current flowing through the secondary battery is provided and the switch means is controlled also based on the current detected by the current detecting means, the protecting operation can be carried out when the current is abnormal, which leads to the more satisfactory protecting operation.

According to a tenth aspect of the present invention, since the time constant circuit for delaying a timing at which the voltage detecting means controls the switch means as compared with the timing at which the voltage detecting means controls the charging circuit is provided, it is possible to prevent the circuit from malfunctioning.

According to an eleventh aspect of the present invention, since a discharge terminal portion connected directly to the secondary battery (not through the charging circuit) is provided and the discharge voltage detecting means for detecting the voltage discharged from the discharge terminal portion is provided, it is possible to satisfactorily protect the secondary battery from overdischarge upon the discharging operation.

According to a twelfth aspect of the present invention, since the means for discriminating whether the secondary battery is charged or discharged is provided and the voltage detecting means controls the charging circuit when the discriminating means determines that the secondary battery is charged, it is possible to prevent the voltage detecting means form malfunctioning upon the discharging operation.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A secondary battery pack comprising:

first and second terminal portions connected to one of a load device and a charging device;

a secondary battery;

voltage detecting means for detecting a voltage level applied to said secondary battery and a battery voltage level of said secondary battery;

switch means connected between one of said first and said second terminal portions and said secondary battery, said switch means being controlled to be in a disconnected state when said voltage detecting means detects a first voltage level; and a charging circuit connected between one of said first and said second terminal portions and said secondary battery, said charging circuit being controlled based on a voltage level detected by said voltage detecting means with reference to a second voltage level lower than said first voltage level by a predetermined voltage level, wherein said voltage detecting means includes first detecting means for detecting said voltage level applied to said secondary battery and second detecting means for detecting said battery voltage level of said secondary battery, said switch means is controlled to be in a disconnected state when said first detecting means detects said first voltage level, said charging circuit is controlled when said first detecting means detects said second voltage level, and said switch means is controlled when said second detecting means detects a voltage level higher than said first voltage level.

2. A secondary battery pack according to claim 3, wherein said secondary battery is charged with a constant voltage, said first voltage level detected by said voltage detecting means is a maximum voltage level which can be applied to said secondary battery, said second voltage level is detected by said voltage detecting means and is a constant charging voltage level applied from said charging circuit to said secondary battery, and based on said voltage level applied to said secondary battery and detected by said voltage detecting means, said charging circuit undergoes a constant voltage control in which a voltage applied from said charging circuit to said secondary battery is set to said second voltage level.

3. A secondary battery pack according to claim 1, further comprising current detecting means for detecting a current flowing through said secondary battery such that when said current detected by said current detecting means exceeds a predetermined current said switch means is controlled to be in said disconnected state and a switch device of said charging circuit is controlled to be in a disconnected state.

4. A secondary battery pack according to claim 1, further comprising a time constant circuit for delaying a timing at which said voltage detecting means controls said switch means from a timing at which said voltage detecting means controls said charging circuit.

5. A secondary battery pack according to claim 1, wherein one of said first and second terminal portions is employed as a terminal connected to a charging device, and further comprising:

a discharge terminal portion connected directly to said secondary battery without being connected through said charging circuit, and discharge voltage detecting means provided for detecting a discharge voltage from said discharge terminal portion, wherein said switch means is controlled to be in said disconnected state when said discharge voltage detecting means detects an overdischarge.

6. A secondary battery pack according to claim 1, further comprising discriminating means for discriminating whether said secondary battery is charged or discharged such that when said discriminating means determines that a charging operation has been carried out said voltage detecting means controls said charging circuit.

7. A secondary battery pack comprising:

first and second terminal portions connected to one of a load device and a charging device;

a secondary battery;

voltage detecting means for detecting a voltage level applied to said secondary battery and a battery voltage level of said secondary battery;

switch means connected between one of said first and said second terminal portions and said secondary battery, said switch means being controlled to be in a disconnected state when said voltage detecting means detects a first voltage level; and a charging circuit connected between one of said first and said second terminal portions and said secondary battery, said charging circuit being controlled based on a voltage level detected by said voltage detecting means with reference to a second voltage level lower than said first voltage level by a predetermined voltage level, wherein said voltage detecting means includes first detecting means for detecting said voltage level applied to said secondary battery and second detecting means for detecting said battery voltage level of said secondary battery, said charging circuit is controlled when said first detecting means detects said second voltage level, and said switch means is controlled to be in said disconnected state when a difference between said voltage level detected by said first detecting means and said battery voltage level detected by said second detecting means is equal to or greater than a predetermined voltage level.

8. A secondary battery pack according to claim 7, wherein when said difference between said voltage level detected by said first detecting means and said battery voltage level detected by said second detecting means is equal to or greater than said predetermined voltage level, a switch device of said charging circuit is controlled to be in a disconnected state.

9. A battery charging method comprising the steps of:

detecting a source voltage level when power from an external DC power source for a charging operation is applied to a terminal;

detecting a detection voltage level which is lower than a reference voltage level by a predetermined voltage level;

setting said source voltage level to be constant; determining whether a voltage level equal to or greater than said reference voltage level has been applied if a malfunction is detected in a constant voltage circuit;

operating a stopper circuit;

setting a switch circuit to an off-state;

stopping a charging operation;

causing said stopper circuit to detect a voltage level with reference to said reference voltage level after detecting said source voltage level when power from said external DC power source for said charging operation is applied to said terminal; and determining whether a voltage level equal to or greater than said reference voltage level has been applied.

10. A battery charging method comprising the steps of:

detecting a first voltage level when power from an external DC power source for a charging operation is applied to a terminal;

detecting a detection voltage level which is lower than a reference voltage level by a predetermined voltage level;

setting said first voltage level to be constant;

determining whether a voltage level equal to or greater than said reference voltage level has been applied if a malfunction is detected in a constant voltage circuit;

operating a stopper circuit;

setting a switch circuit to an off-state;

stopping a charging operation;

detecting a second voltage level which is slightly higher than said first voltage level;

determining whether said second voltage level is higher than said first voltage level by a predetermined value;

causing said stopper circuit to detect a voltage-level with reference to said reference voltage level after detecting said first voltage level when power from said external DC power source for said charging operation is applied to said terminal; and determining whether a voltage level equal to or greater than said reference voltage level has been applied.

11. A battery charging method comprising the steps of:

detecting a source voltage level when power from an external DC power source for a charging operation is applied to a terminal;

detecting a detection voltage level which is lower than a reference voltage level by a predetermined voltage level;

setting said source voltage level to be constant;

determining whether a voltage level equal to or greater than said reference voltage level has been applied if a malfunction is detected in constant voltage circuit;

operating a stopper circuit;

setting a switch circuit to an off-state;

stopping a charging operation;

detecting a third voltage level that is slightly lower than said first voltage level;

determining whether said third voltage level is lower than said first voltage level by a predetermined value;

releasing a reset operation in order to set said switch circuit to an on-state;

causing said stopper circuit to detect a voltage level with reference to said reference voltage level after detecting said source voltage level when power from said external DC power source is applied to said terminal; and determining whether a voltage level equal to or greater than said reference voltage level has been applied.

12. A battery charging method comprising the steps of:

carrying out a first voltage detecting processing by a first detecting circuit;

carrying out a second voltage detecting processing by a second detecting circuit;

detecting a difference voltage between the first voltage detected by said first detecting circuit and the second voltage detected by said second detecting circuit;

determining whether said detected difference voltage exceeds a reference value set in a difference voltage detecting circuit; and operating a stopper circuit if said difference voltage exceeds said reference value.

13. A battery charging method comprising the steps of:

detecting an input voltage level with reference to an upper limit voltage level;

determining whether said detected input voltage level exceeds said upper limit voltage level;

operating a stopper circuit if said detected input voltage level exceeds said upper limit voltage level; and detecting said input voltage level with reference to a lower limit voltage level if said detected input voltage level does not exceed said upper limit voltage level.

14. A battery charging method comprising the steps of:

detecting whether a charging or discharging operation is being carried out;

determining whether a mode is a charging or a discharging mode;

operating a switch circuit in a constant voltage mode if said mode is determined to be said charging mode;

operating said switch circuit in a switch mode if said mode is determined to be said discharging mode.

* * * * *